US008608832B2

(12) United States Patent
Tabata et al.

(10) Patent No.: US 8,608,832 B2
(45) Date of Patent: Dec. 17, 2013

(54) APPARATUS FOR CONCENTRATING AND DILUTING SPECIFIC GAS AND METHOD FOR CONCENTRATING AND DILUTING SPECIFIC GAS

(71) Applicants: Yoichiro Tabata, Tokyo (JP); Tetsuya Saitsu, Tokyo (JP); Yujiro Okihara, Tokyo (JP); Nobuyuki Itoh, Tokyo (JP); Ryohei Ueda, Tokyo (JP); Yasuhiro Tanimura, Tokyo (JP); Koji Ohta, Tokyo (JP)

(72) Inventors: Yoichiro Tabata, Tokyo (JP); Tetsuya Saitsu, Tokyo (JP); Yujiro Okihara, Tokyo (JP); Nobuyuki Itoh, Tokyo (JP); Ryohei Ueda, Tokyo (JP); Yasuhiro Tanimura, Tokyo (JP); Koji Ohta, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 13/856,126

(22) Filed: Apr. 3, 2013

(65) Prior Publication Data

US 2013/0291718 A1 Nov. 7, 2013

Related U.S. Application Data

(62) Division of application No. 12/160,648, filed as application No. PCT/JP2006/323807 on Nov. 29, 2006, now Pat. No. 8,500,874.

(30) Foreign Application Priority Data

Jul. 4, 2006 (JP) .................... PCT/JP2006/313309

(51) Int. Cl.
*B01D 53/02* (2006.01)

(52) U.S. Cl.
USPC ................... 95/115; 95/138; 95/257; 95/290; 96/108; 62/606

(58) Field of Classification Search
USPC .......... 95/115, 138, 257, 290; 62/606; 96/108
See application file for complete search history.

(56) References Cited

U.S. PATENT DOCUMENTS 2,473,384 A * 6/1949 McNeely ......................... 62/105
3,364,129 A * 1/1968 Cremer et al. ............ 422/186.19

(Continued)

FOREIGN PATENT DOCUMENTS

EP  0 157 564 A2  10/1985
JP  56-126205  9/1981

(Continued)

OTHER PUBLICATIONS

"Advanced Water Cleaning Technique Centering on Ozone", Jul. 1990, pp. 48-49, Sanshu Shobo.

(Continued)

*Primary Examiner* — Christopher P Jones
(74) *Attorney, Agent, or Firm* — Sughrue Mion, PLLC

(57) ABSTRACT

One ozone concentrating chamber is provided therein with a part of a cooling temperature range where ozone can be selectively condensed or an oxygen gas can be selectively removed by transmission from an ozonized oxygen gas, and a part of a temperature range where condensed ozone can be vaporized, and condensed ozone is vaporized by moving condensed ozone with flow of a fluid or by gravitation to the part where condensed ozone can be vaporized, whereby the ozonized oxygen gas can be increased in concentration. Such a constitution is provided that a particle material 13 for condensation and vaporization filled in the ozone concentrating chambers 11 and 12 has a spherical shape of a special shape with multifaceted planes on side surfaces, or an oxygen transmission membrane 130 capable of selectively transmitting an oxygen gas in an ozone gas is provided.

6 Claims, 21 Drawing Sheets

(56) References Cited

U.S. PATENT DOCUMENTS

| | | | | |
|---|---|---|---|---|
| 4,271,676 | A * | 6/1981 | Hvizdos | 62/50.1 |
| 4,594,101 | A * | 6/1986 | Miura et al. | 75/252 |
| 4,966,666 | A * | 10/1990 | Waltonen | 204/164 |
| 5,030,334 | A * | 7/1991 | Hale | 205/782.5 |
| 5,104,466 | A * | 4/1992 | Allard et al. | 149/21 |
| 7,628,845 | B2 * | 12/2009 | Hao et al. | 96/126 |
| 2001/0015072 | A1 * | 8/2001 | Assaf | 62/271 |
| 2006/0086247 | A1 | 4/2006 | Vininski et al. | |
| 2006/0248921 | A1 * | 11/2006 | Hosford et al. | 62/611 |

FOREIGN PATENT DOCUMENTS

| | | | |
|---|---|---|---|
| JP | 57-088031 | A | 6/1982 |
| JP | 1-139802 | U | 9/1989 |
| JP | 01-257103 | A | 10/1989 |
| JP | 05-155607 | A | 6/1993 |
| JP | 5-52689 | U | 7/1993 |
| JP | 06-015174 | A | 1/1994 |
| JP | 06-115906 | A | 4/1994 |
| JP | 09-208202 | A | 8/1997 |
| JP | 09-243208 | A | 9/1997 |
| JP | 11-199207 | A | 7/1999 |
| JP | 11-244652 | A | 9/1999 |
| JP | 11-335102 | A | 12/1999 |
| JP | 2000-262837 | A | 9/2000 |
| JP | 2000-351609 | A | 12/2000 |
| JP | 2001-133141 | A | 5/2001 |
| JP | 2001-133142 | A | 5/2001 |
| JP | 2002-201020 | A | 7/2002 |
| JP | 2003-206107 | A | 7/2003 |
| JP | 2004-359537 | A | 12/2004 |
| JP | 2005-347679 | A | 12/2005 |
| JP | 2005-350323 | A | 12/2005 |

OTHER PUBLICATIONS

Supplementary European Search Report dated Dec. 21, 2011 issued in a corresponding European Patent Application No. 06833611.4.
Translation of JP 2000-351609 A (The BOC Group, Inc.), Dec. 19, 2000.

* cited by examiner

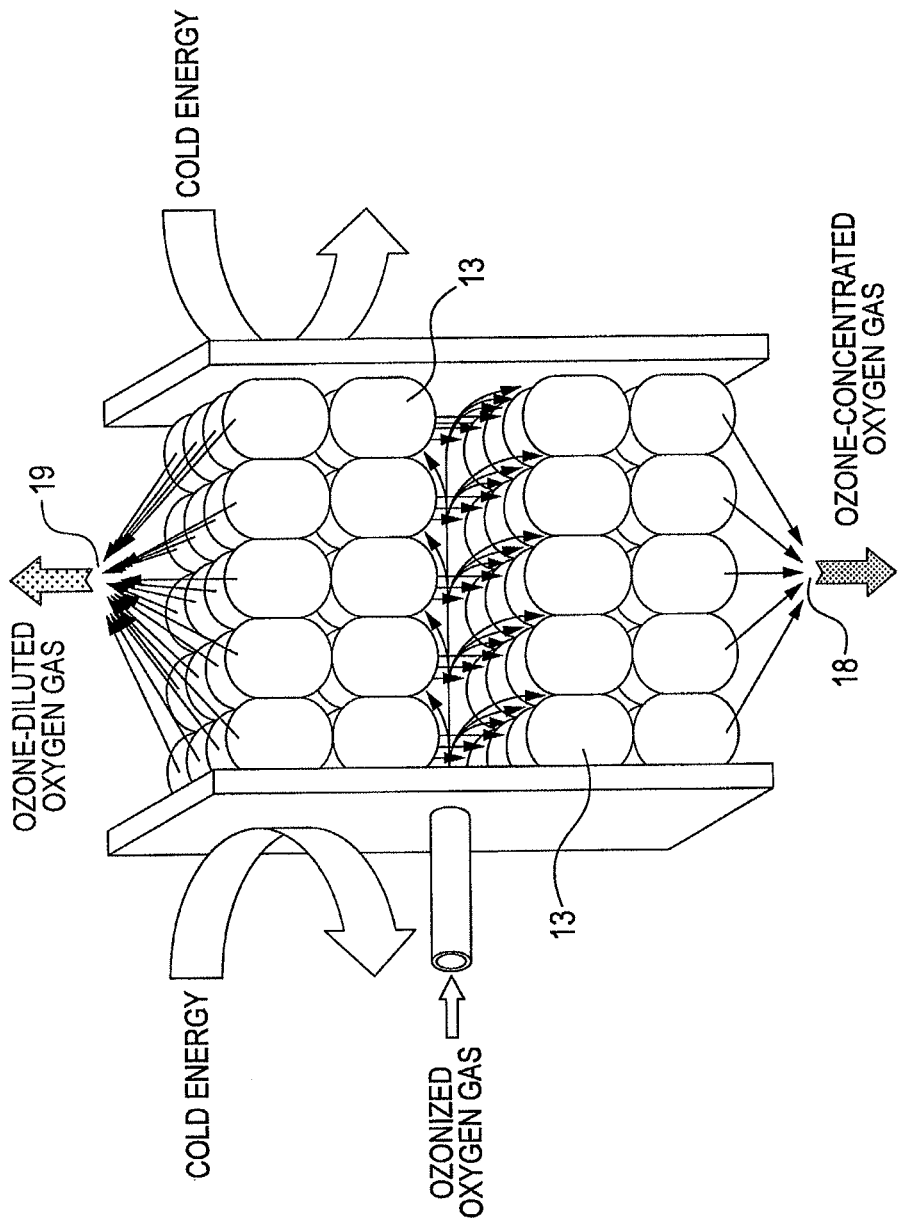

OZONE CONCENTRATION CHARACTERISTICS AND CONDENSATION OF OZONE GAS AT LOW TEMPERATURE

OZONE CONCENTRATION CHARACTERISTICS AND EVAPORATION OF OZONE GAS AT LOW TEMPERATURE

APPARATUS FOR CONCENTRATING AND DILUTING SPECIFIC GAS AND METHOD FOR CONCENTRATING AND DILUTING SPECIFIC GAS

CROSS REFERENCE TO RELATED APPLICATIONS

This application is a divisional of U.S. patent application Ser. No. 12/160,648, filed Jul. 11, 2008, now U.S. Pat. No. 8,500,874 B2, which is a National Stage of International Application No. PCT/JP2006/323807 filed on Nov. 29, 2006, claiming priority based on Japanese Patent Application No. PCT/2006/313309, filed Jul. 4, 2006, the contents of all of which are incorporated herein by reference in their entirety.

TECHNICAL FIELD

The present invention relates to an apparatus and a method of selectively condensing only a specific gas or selectively transmitting other gases than a specific gas from a gas containing plural gas species, so as to concentrate or dilute the specific gas. In particular, it relates to an apparatus for concentrating and diluting a specific gas and a method therefor, in which by using only one chamber with a simple constitution without plural concentrating steps and retrieving steps, a specific gas is selectively condensed or other gases than the specific gas are selectively transmitted to form a diluted gas in a diluted gas retrieving part of the chamber, and simultaneously the condensed liquid is moved by gravitation to a concentrated gas retrieving part at a lower part of the chamber and is then gasified, so as to form a concentrated gas in the concentrated gas retrieving part of the chamber, whereby the concentrated gas and the diluted gas can be separately retrieved continuously from the two gas retrieving parts of the chamber.

BACKGROUND ART

A conventional apparatus for concentrating and diluting only a specific gas from a gas containing plural gas species includes an ozone concentrating apparatus, a NOx or Freon removing apparatus, a $CO_2$ removing apparatus and the like. In the techniques of the conventional apparatuses, only a specific gas is cooled and is once liquefied or adsorbed on an absorbent, such as silica gel, and in the next step, the gas substance having been liquefied or adsorbed on the adsorbent is again gasified through evaporation or desorption by heating, whereby the specific gas is concentrated. A gas having been concentrated by using the apparatus is utilized as a chemical reactive gas for an apparatus for producing a semiconductor, whereby it is applied to a production technique of a semiconductor having higher quality, and is applied to an environmental improvement technique, such as detoxification of a concentrated toxic gas through heat or catalytic reaction.

A first example of a conventional apparatus for concentrating and diluting a specific gas is such an apparatus that about 10% (220 g/Nm$^3$) of an ozonized gas (oxygen:90%, ozone:10%) generated with an ozone generator is fed to a chamber cooled to from 80 K (−193° C.) to 100 K (−173° C.) to liquefy only an ozone gas, in the next step the gas part in the chamber is vacuumized with an evacuating device, in the further next step the liquefied ozone gas is heated to a temperature around from 128 K (−145° C.) to 133 K (−140° C.) with a heating means, such as a heater, to convert the vacuumized gas part to a 100% ozone gas at from 50 Torr (53 hPa) to 70 Torr (100 hPa), which corresponds to the vapor pressure of ozone, and the vaporized ozone is retrieved (as described, for example, in Patent Document 1).

A second example of a conventional apparatus for concentrating and diluting a specific gas is such an apparatus that an ozonized gas generated with an ozone generator is fed to a chamber having filled therein an adsorbent and having been cooled to a low temperature (−60° C.) to adsorb only an ozone gas to the adsorbent (adsorbing step), and in the next step the gas part in the chamber is evacuated to vacuum with an evacuating device, in the further next step the ozone gas adsorbed to the adsorbent is heated to a temperature around 0° C. with a heating means, such as a heater, whereby a 95% concentrated ozone gas at about 100 Torr (53 hPa) is retrieved from the vacuumized adsorbent part at a flow rate of about 500 cc/min (desorbing step) (as described, for example, in Patent Document 2).

In Patent Document 2, in order to retrieve the concentrated ozone gas continuously, the adsorbing step and the desorbing step are repeated alternately in time series by providing three of the aforementioned chamber having filled therein the adsorbent, and an ozonized gas having a high concentration can be fed stably by providing a buffer tank. It is also disclosed therein that an oxygen gas and the like are fed to the buffer tank along with the concentrated ozone gas, whereby an ozonized gas having an ozone concentration of from 30 to 95% can be fed.

In the field of production of semiconductors, there is severe competition in development for realizing a highly integrated semiconductor device, and for example, there is such a proposal that in a production process of a nonvolatile semiconductor memory device (nonvolatile memory) having a silicon oxide film formed on a nitride film on a silicon wafer, a control electrode and a floating gate electrode are formed in such a manner that an extremely thin oxide film of about 2 nm is formed, and as an oxide film forming means capable of suppressing an interlayer leakage electric current, a low temperature oxidation chemical reaction with a superhigh purity ozonized gas containing no impurity than oxide and ozone gas having 20% (440 g/Nm$^3$) or more and irradiation of an ultraviolet ray or plasma discharge is used to form an oxide film having good quality, whereby such an oxide film can be realized that satisfies the aforementioned thickness and the requirement in electric current regulation (as described, for example, in Patent Document 3).

In the field of production of semiconductors, it is important to form an oxide film having high quality for increasing the integration degree. Accordingly, importance is given to a technique of continuously supplying a superhigh purity ozonized gas of 20% (440 g/Nm$^3$) or more, i.e., a highly concentrated ozone gas, economically in large quantity with safety. The application field of a conventional apparatus for concentrating and diluting a specific gas includes an apparatus for removing a NOx gas or a Freon gas and an apparatus for removing a $CO_2$ gas. The apparatus for removing a NOx gas includes plural steps, i.e., in the first step a Freon gas or a $CO_2$ gas, a gas containing a NOx gas or a $CO_2$ gas is adsorbed to an adsorbent at a low temperature or under pressure, in the second step the gas is desorbed at a high temperature or in a depressurized state, and then in the third step the desorbed NOx, Freon or $CO_2$ gas is decomposed and removed through heat, chemical reaction or catalytic chemical reaction.

As an example of the conventional apparatus for removing a NOx gas, there is proposed that a NOx gas derived from a combustion waste gas is adsorbed to a metallic oxide substance by making the gas in contact with the metallic oxide substance, whereby the NOx gas contained in the combustion waste gas is removed (apparatus for diluting a NOx gas) (as described, for example, in Patent Document 4). The application field of a conventional apparatus for concentrating and diluting a specific gas includes an apparatus for removing a $CO_2$ gas. As the apparatus for removing a $CO_2$ gas, such apparatuses are proposed that a waste gas containing a carbon dioxide gas is adsorbed to porous tubes to remove a $CO_2$ gas from the waste gas (as described, for example, in Patent Document 5), and air in a room containing a carbon dioxide gas is made in contact with a carbon dioxide gas adsorbing sheet with a fan to adsorb a carbon dioxide gas to the carbon dioxide gas adsorbing sheet, whereby the air in the room is cleaned (apparatus for diluting a $CO_2$ gas) (as described, for example, in Patent Document 6). The NOx or $CO_2$ gas thus adsorbed with the apparatus for removing a NOx or $CO_2$ gas contributes to enhancement of efficiency for a processing technique such as reducing into an $N_2$ gas and converting into ammonia, carbon or methane due to activating the surface of the metallic oxide substance and then accelerating the catalytic chemical reaction on the surface of the metallic oxide substance by applying heat or generating discharge, on the surface of the metallic oxide substance.

Patent Document 1: JP-A-2001-133141
Patent Document 2: JP-A-11-335102
Patent Document 3: JP-A-2005-347679
Patent Document 4: JP-A-6-15174
Patent Document 5: JP-A-2000-262837
Patent Document 6: JP-A-11-244652
Patent Document 7: JP-A-2004-359537
 (Japanese Patent No. 3,642,572)
Patent Document 8: JP-A-9-208202
Non-patent Document 1: "Ozone wo chushintoshita Kodo Josuii Shori Gijutsu" (Advanced Water Cleaning Technique centering on Ozone), p. 48-49, published by Sanshu Shobo (July 17, Heisei 2 (1990)

It is believed that the invention is not disclosed in the aforementioned conventional art documents and has novelty and inventive step. In particular, such an apparatus is not disclosed that is constituted with a chamber having filled therein a particle material for condensation and vaporization, and a chamber having formed therein a gas transmission member (membrane). Furthermore, no document discloses such an apparatus and method that the upper part of the chamber is cooled with a cooler to condense selectively a specific gas on the surface of the particle material, and other gases than the specific gas are selectively transmitted through the gas transmission member (membrane), and the condensed gas is vaporized on the surface of the heated particle material or gas transmission member (membrane) on the lower part of the chamber, whereby the specific gas is concentrated.

In the conventional technique of concentrating an ozonized gas as a specific gas, in the first step an ozone gas generated with an ozone generator is liquefied or adsorbed to an adsorbent by cooling, in the second step gasses that cannot be adsorbed are evacuated to vacuum, and in the third step the liquefied or adsorbed gas is heated to obtain 100% ozone or a highly concentrated ozone gas of 95%. In the concentrating apparatus, the system becomes complicated since the operations of the three steps are repeated alternately, and control in pressure and flow rate and control of valves for switching the pipings for every steps become complicated, whereby such a problem arises that the apparatus is increased in size, and the cost of the apparatus is increased.

Impurity gases contained in an ozone gas generated with an ozone generator are accumulated as an impurity liquid in a liquefaction container through the liquefying and adsorbing steps of ozone, whereby there is a necessity of removing the impurity liquid periodically, or the impurity liquid remains as being adsorbed to the adsorbent to be a factor of deterioration in performance of ozone adsorption.

Upon vaporizing the liquefied ozone liquid or adsorbed ozone by heating, if they are rapidly heated, abrupt vaporization or desorption occurs from the ozone liquid or adsorbed ozone to cause danger of explosion due to rapid increase of the gas pressure.

Accordingly, since the rapid vaporization or desorption is prevented from occurring, and the vaporization or desorption is to be effected in a low pressure state, there is such a problem that only an ozonized gas having a low pressure can be supplied, and there are such problems that in the field of production of semiconductors, mass production (batch process) cannot be attained, and a concentrated ozone gas cannot be dispersed uniformly to a wafer processing chamber. Furthermore, an ozone gas generated with an ozone generator is continuously fed to a liquefaction chamber or an adsorption chamber to liquefy the gas to a prescribed amount or to adsorb once the gas the adsorbent to around 100% ozone, and the gas that cannot be liquefied or the ozone gas that cannot be adsorbed is discarded to a waste ozone apparatus, which brings about such a problem that an ozone gas cannot be effectively concentrated.

In the conventional technique of removing a NOx or $CO_2$ gas as a specific gas to clean a waste gas or air in a room (dilution of a specific gas), when the adsorption amount of the adsorbent is saturated, such a problem arises that the adsorbent is necessarily regenerated or replaced.

Furthermore, in the case where the NOx or $CO_2$ gas as a specific gas is processed with the processing such as reducing into an $N_2$ gas and converting into ammonia, carbon or methane, due to activating the surface of the metallic oxide substance and then accelerating the catalytic chemical reaction on a surface of a metallic oxide substance by applying heat or generating discharge, on the surface of the metallic oxide substance, there is such a problem that the gas cannot be efficiently processed.

DISCLOSURE OF THE INVENTION

Problems to be Solved by the Invention

The invention has been made in view of the aforementioned problems and is to provide an apparatus and a method capable of continuously concentrating and diluting a specific gas with only one apparatus and one process step. The invention is also to realize such an apparatus that can be easily controlled in amount, pressure and degree of concentrating of a concentrated gas, is excellent in safety and compactness, and is inexpensive.

Means for Solving the Problems

The apparatus for concentrating and diluting a specific gas of the invention is characterized in that the apparatus contains a specific gas concentrating system containing a freezing machine that cools the specific gas fed to a chamber to a cool temperature, the chamber having filled therein a particle material for condensation and vaporization capable of selectively condensing the specific gas or having equipped therein a gas transmission member selectively transmitting other gases than the specific gas, and a gas feeding and retrieving system having a feeding port feeding a gas containing plural gas species, a diluted gas retrieving port retrieving a gas containing the specific gas having been diluted, and a concentrated gas retrieving port retrieving a gas containing the specific gas having been concentrated, the diluted gas retrieving part of the gas fed to the chamber selectively condensing the specific gas on a surface of the particle material or the gas transmission member or selectively transmitting the other gases than the specific gas on a surface of the gas transmission member, so as to realize dilution of the specific gas, and the concentrated gas retrieving part of the gas fed to the chamber vaporizing the condensed gas on the surface of the particle material by heating a surrounding of the concentrated gas retrieving part, so as to realize concentration of the specific gas, thereby continuously retrieving the gas containing the specific gas having been diluted through the diluted gas retrieving part of the chamber or the gas containing the specific gas having been concentrated through the concentrated gas retrieving part of the chamber.

The method for concentrating and diluting a specific gas of the invention is a method for concentrating or diluting only a specific gas from a gas containing plural gas species, which includes filling a particle material for condensation and vaporization of the specific gas to a gas concentrating and diluting chamber or Equipping a gas transmission member selectively transmitting other gases than the specific gas, and having a gas feeding and retrieving system having a function of cooling the gas in the chamber equipped therein and having a function of retrieving a gas containing the specific gas having being diluted and retrieved a gas containing the specific gas having been concentrated; which comprises a step of introducing the specific gas containing the plural gas species in the chamber, a step of selectively condensing only the specific gas on a surface of the particle material for condensation and vaporization or the gas transmission member and selectively transmitting the other gases than the specific gas by the gas transmission member to realize dilution of the specific gas to a diluted gas retrieving part of the chamber, and a step of vaporizing the condensed gas on the surface of the particle material to realize high concentration of the specific gas to a concentrated gas retrieving part of the chamber by heating a surrounding of a concentrated gas retrieving part of the chamber while streaming down a liquid condensed on the surface of the particle material to a lower part of the chamber by gravitation, wherein a gas containing the specific gas having been diluted from the diluted gas retrieving part of the chamber or a gas containing the specific gas having been concentrated from the concentrated gas retrieving part of the chamber is continuously retrieved.

The method for concentrating and diluting a specific gas of the invention is characterized by, in the aforementioned apparatus for concentrating and diluting a specific gas containing the chamber having filled therein the particle material, providing at least one of an automatic pressure controller (APC) controlling an inner pressure of the chamber and a mass flow rate controller (MFC) controlling a flow rate of a gas retrieved from the chamber, on at least one of the gas retrieving port of the diluted gas retrieving part and the gas retrieving port of the concentrated gas retrieving part of the chamber of the chamber, automatically controlling the inner pressure of the chamber to a prescribed pressure with the automatic pressure controller (APC), and setting a flow rate of a gas containing the specific gas having been diluted retrieved from the diluted gas retrieving part of the chamber through them with the mass flow rate controller (MFC), thereby enabling automatic control of a concentrated gas concentration and flow rate upon continuously retrieving a gas containing the specific gas having been concentrated.

The method for concentrating and diluting a specific gas of the invention is characterized by, in the aforementioned apparatus for concentrating and diluting a specific gas containing the chamber having filled therein the gas transmission member, making pressures at the diluted gas retrieving part and the concentrated gas retrieving part to P1 and P2, respectively, by providing an automatic pressure controller I (APC I) or a gas pressure controlling valve I controlling an inner pressure P1 of the chamber of a diluted gas having the specific gas removed by transmitting other gases than the specific gas at the diluted gas retrieving part of the chamber, and providing an automatic pressure controller II (APC II) or a gas pressure controlling valve II controlling an inner pressure P2 at the concentrated gas retrieving part of the chamber, thereby producing a gas pressure difference $\Delta P$ $(=P2-P1)$ on sides between the gas transmitting member, continuously retrieving a gas containing the specific gas having been diluted from the diluted gas retrieving part of the chamber and a gas containing the specific gas having been concentrated from the concentrated gas retrieving part of the chamber through them, varying at least one set pressures of the automatic pressure controller I (APC I) and the automatic pressure controller II (APC II), thereby enabling control of a concentrated gas concentration upon continuously retrieving the gas containing the specific gas having been concentrated.

Advantages of the Invention

According to the first aspect of the invention, only a specific gas can be continuously separated into a diluted gas and a concentrated gas with only one step, whereby such an advantage can be obtained that provides an apparatus for concentrating and diluting a specific gas that is improved in process efficiency, has a small size, is inexpensive, and has safety, as compared to the conventional art, and provides a method for concentrating and diluting a specific gas therefor.

According to the second aspect of the invention, a chamber having filled therein a particle material for condensation and vaporization selectively condensing the specific gas or having equipped therein a gas transmission member selectively transmitting other gases than the specific gas is cooled, so as to cool a gas containing plural gas species fed to the chamber, and by the cooling effect of the gas, the adsorption rate of the specific gas is improved to improve the effect of selectively condensing the specific gas on the particle material for condensation and vaporization. The invention also has an advantage of further improving the effect of selectively transmitting the other gases than the specific gas through the gas transmission material by cooling the gas.

According to the apparatus for concentrating and diluting a specific gas containing the chamber having equipped therein the particle material of the invention, a means for continuously retrieving the concentrated gas of the specific gas from a gas retrieving pipe through the automatic pressure controller (APC) having a flow rate controlling means automatically controlling the pressure of the chamber is provided, and the diluted gas of the specific gas is continuously retrieved from a gas retrieving pipe through a flow rate controller having a means capable of controlling the flow rate with a mass flow rate controller or a flow rate valve provided on an upper part of the chamber, whereby the concentration of the diluted gas and the flow rate and the concentration of the concentrated gas of the specific gas can be controlled by setting the flow rate of the diluted gas of the specific gas, and a stable concentrated gas can be retrieved.

According to the apparatus for concentrating and diluting a specific gas containing the chamber having equipped therein the gas transmission member of the invention, an automatic pressure controller I (APC I) or a gas pressure controlling valve I controlling the inner pressure P1 of the chamber of the diluted gas having the specific gas removed by transmitting other gases than the specific gas at the diluted gas retrieving part of the chamber is provided, an automatic pressure controller II (APC II) or a gas pressure controlling valve II controlling an inner pressure P2 at the concentrated gas retrieving part of the chamber is provided, and a gas pressure difference ΔP (=P2−P1) between the diluted gas retrieving part and the concentrated gas retrieving part is provided, whereby the transmission amount of the gas other than the specific gas can be increased to separate the gas to a higher concentration, and a stable concentrated gas can be retrieved.

According to the apparatus for concentrating and diluting a specific gas containing the chamber having equipped therein the gas transmission member of the invention, the inner pressure P1 in the chamber at the retrieving part of the diluted gas having the specific gas removed by transmitting the other gases than the specific gas is set to the atmospheric pressure (0 MPa) or more, and the pressure P2 at the concentrated gas retrieving part is set to a range of from 0.1 MPa to 0.5 MPa, to provide a gas pressure difference ΔP (=P2−P1) between sides of the gas transmission members of 0.1 MPa or more, whereby the diluted gas can be released without necessity of decreasing the pressure at the diluted gas retrieving part below the atmospheric pressure to separate the gas to a higher concentration, and a stable concentrated gas can be retrieved.

According to the apparatus for concentrating and diluting a specific gas containing the chamber having equipped therein the gas transmission member of the invention, an ozonized gas containing an ozone gas is used as the gas containing plural gas species that is fed to the concentrating and diluting apparatus, and the gas transmission member is constituted with a Teflon (a trade name) membrane material or a ceramic material, whereby the gas transmission member can have ozone resistance or NOx resistance to provide an advantage of providing a stable concentrating and diluting apparatus having a longer service life.

According to another aspect of the invention, an ozonized gas containing an ozone gas is used as the gas containing plural gas species that is fed to the concentrating and diluting apparatus, and the temperature for cooling the gas in the chamber with the freezing machine for cooling is set at −100° C. or more, whereby a freezing machine for an extremely low temperature exceeding −100° C. may not be used, and the thermal insulation structure of the chamber is simplified, thereby making the concentrating and diluting apparatus inexpensive.

According to still another aspect of the invention, an ozonized gas containing an ozone gas is used as the gas containing plural gas species that is fed to the concentrating and diluting apparatus, and the ozonized gas diluted gas (oxygen gas) retrieved from the diluted gas retrieving part of the chamber is made to have a high pressure with a gas compressor to reuse the gas as a raw material gas for an ozone gas generator, whereby such an advantage is obtained that an oxygen gas can be efficiently an ozonized gas.

According to the apparatus for concentrating and diluting a specific gas containing the chamber having equipped therein the particle material of the invention, for providing a temperature distribution in the chamber having a less temperature distribution in the radial direction and a prescribed temperature gradient in the axial direction, upon cooling the concentrating chamber, the thickness of the thermal insulating material around the chamber is adjusted, the arrangement of the particles for condensation having been filled is made to be a layer form, the shape of the particle material for condensation and vaporization is made to be a spherical shape with a part of the side surface thereof being flattened, to make the flattened parts of the spherical particle material for condensation and vaporization in contact with each other upon filling in the chamber, whereby the cooling distribution in the concentrating chamber can be uniform in the radial direction and can have a large temperature distribution in the axial direction, and thus the condensation effect and the vaporization effect of the specific gas by cooling can be efficiently conducted to provide such an effect that the concentrated gas can be retrieved compactly and inexpensively.

According to the apparatus for concentrating and diluting a specific gas containing the chamber having equipped therein the particle material of the invention, the material of the particle material for condensation and vaporization is glass, ceramics or a metal that does not undergo chemical reaction with the gas containing plural gas species, whereby the specific gas can be easily condensed and vaporized.

According to the apparatus for concentrating and diluting a specific gas containing the chamber having equipped therein the particle material of the invention, the material of the particle material for condensation and vaporization is glass, ceramics or a resin material, and the surface of the particles is coated with a metallic film that does not undergo chemical reaction with the gas containing plural gas species, whereby the metallic film good in thermal conductivity can be preferentially cooled and heated, and thus the specific gas can be rapidly condensed and vaporized, thereby enabling dilution and concentration of the gas with higher responsiveness.

According to still another aspect of the invention, the liquefied gas concentrating and diluting apparatuses are provided plurally as a multistage cascade to improve the degree of concentrating and the degree of diluting of the concentrated gas and the diluted gas of the specific gas, whereby the gas can be separated into gases being further diluted and concentrated.

According to still another aspect of the invention, an ozonized gas containing an ozone gas is used as the gas containing plural gas species that is introduced to the concentrating and diluting apparatus, and ozone of the ozonized gas is concentrated to be an ozone gas having a high concentration, whereby semiconductors having high quality can be produced in a low temperature state by utilizing chemical reaction of the ozone gas having a high concentration in the field of semiconductors.

According to still another aspect of the invention, an ozonized gas having a concentration of about 116,629 ppm (250 g/Nm$^3$) or more generated with an ozone generator generating an ozone gas is used as the gas containing plural gas species that is introduced to the concentrating and diluting apparatus, and ozone of the ozonized gas is concentrated to be an ozone gas having a high concentration, whereby such an advantage is obtained that an ozone gas can be efficiently concentrated.

According to still another aspect of the invention, an ozonized gas generated with a nitrogen-free ozone generator generating an ozone gas from a high purity oxygen gas having an addition amount of a nitrogen gas of 1 ppm or less is used as the gas containing plural gas species that is introduced to the concentrating and diluting apparatus, and ozone of the ozonized gas is concentrated to be an ozone gas having a high concentration, whereby an ozone gas with a less amount of NOx gas can be concentrated to reduce deposition of metallic contamination due to a NOx gas, and thus semiconductors having higher quality can be produced in the field of semiconductors.

According to still another aspect of the invention, air containing a carbon dioxide ($CO_2$) gas is used as the gas containing plural gas species that is introduced to the concentrating and diluting apparatus, and the carbon dioxide ($CO_2$) gas of air containing a carbon dioxide gas is concentrated to separate into air containing carbon dioxide ($CO_2$) having been concentrated and air containing carbon dioxide ($CO_2$) having been diluted (cleaned), whereby a large amount of an atmospheric gas can be concentrated and diluted by an inexpensive system. Furthermore, such an advantage is obtained that concentrated carbon dioxide ($CO_2$) can be efficiently decomposed or solidified.

According to still another aspect of the invention, air containing a NOx (such as $NO_2$, $N_2O$, NO, $N_2O_5$ and $HNO_3$ vapor) gas or a Freon gas is used as the gas containing plural gas species that is introduced to the concentrating and diluting apparatus, and the NOx gas of air containing a NOx gas is concentrated to separate into air containing NOx having been concentrated and air containing NOx having been diluted (cleaned), whereby a large amount of an atmospheric gas can be concentrated and diluted by an inexpensive system. Furthermore, such an advantage is obtained that a concentrated NOx (such as $NO_2$, $N_2O$, NO, $N_2O_5$ and $HNO_3$ vapor) gas and a Freon gas can be efficiently decomposed.

BRIEF DESCRIPTION OF THE DRAWINGS

FIGS. 2-*b* and 2-*c* is a characteristic diagram showing ozone concentrating characteristics with respect to the flow rates of the concentrated oxygen gas and the diluted oxygen gas to be retrieved in the ozone gas concentrating system of the first embodiment (selective condensation of an ozone gas) of the invention.

FIG. 2-*d* is a block diagram showing a gas controlling system of an ozone gas concentrating system apparatus showing flow rate control and pressure control in a system of from feed of an ozonized oxygen gas to retrieval of the concentrated oxygen gas and the diluted oxygen gas in the ozone gas concentrating system of the embodiment 1 (selective condensation of an ozone gas) of the invention.

FIG. 3-*b* shows another example of an ozone concentrating chamber main body of an ozone gas concentrating system in the embodiment 2 (selective condensation of an ozone gas) of the invention.

FIG. 13-*b* is a constitutional diagram of a batch type CVD apparatus utilizing concentrated ozonized oxygen of the ozone gas concentrating system apparatus of the embodiments 1 and 2 of the invention.

BEST MODE FOR CARRYING OUT THE INVENTION

Embodiment 1

Figure 1:
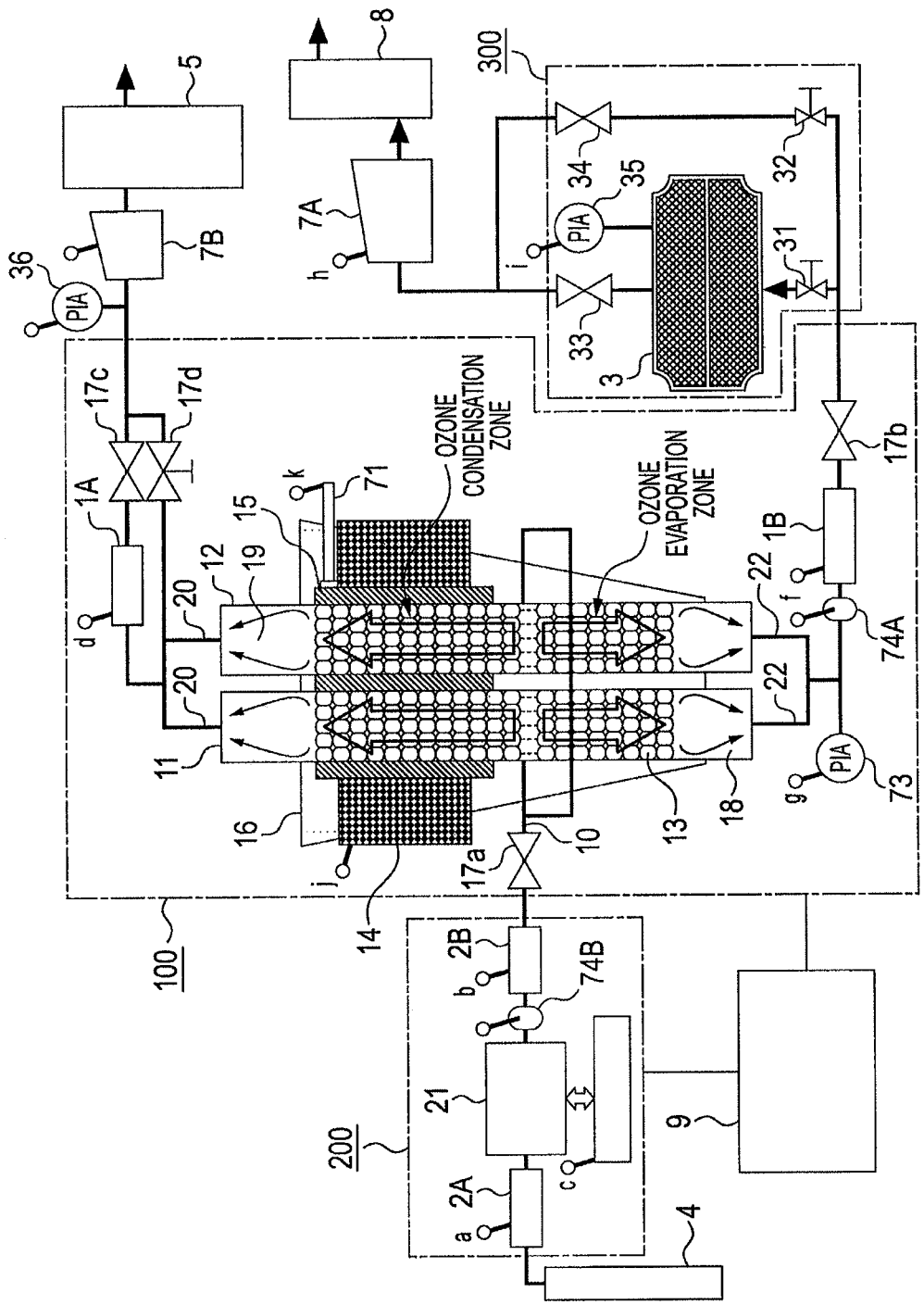
FIG. 1 is an illustration of an ozone concentrating system showing a constitution of ozone gas concentration in an embodiment 1 (selective condensation of an ozone gas) of the invention.
Figure 2B:
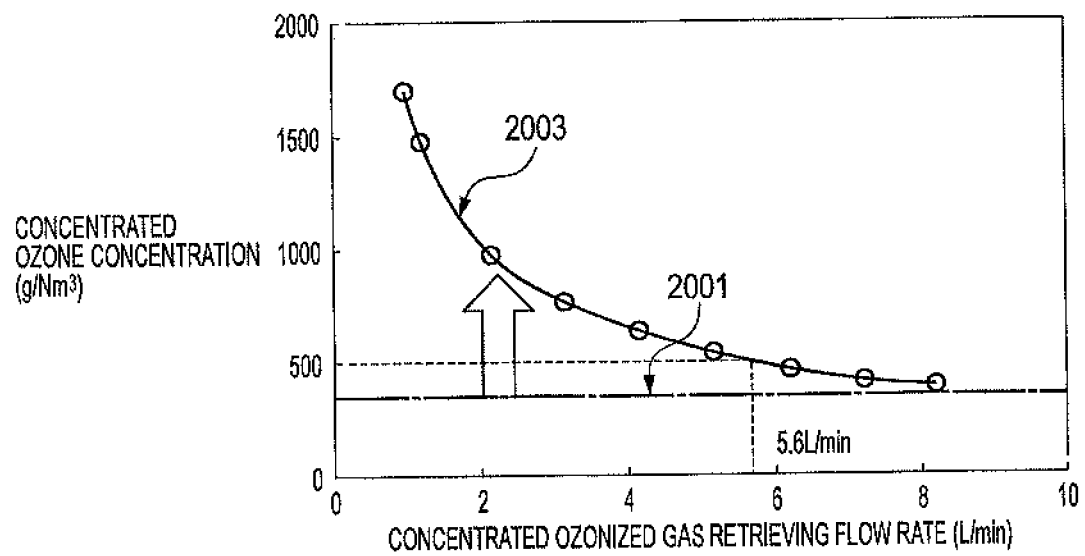
FIG. 2-*a* is a schematic illustration showing a concentration mechanism of an ozonized oxygen gas in the embodiment 1 (selective condensation of an ozone gas) of the invention, in which an ozonized oxygen gas is fed and separated into an oxygen gas containing an ozone gas having been concentrated and an oxygen gas containing an ozone gas having been diluted.
Figure 2C:
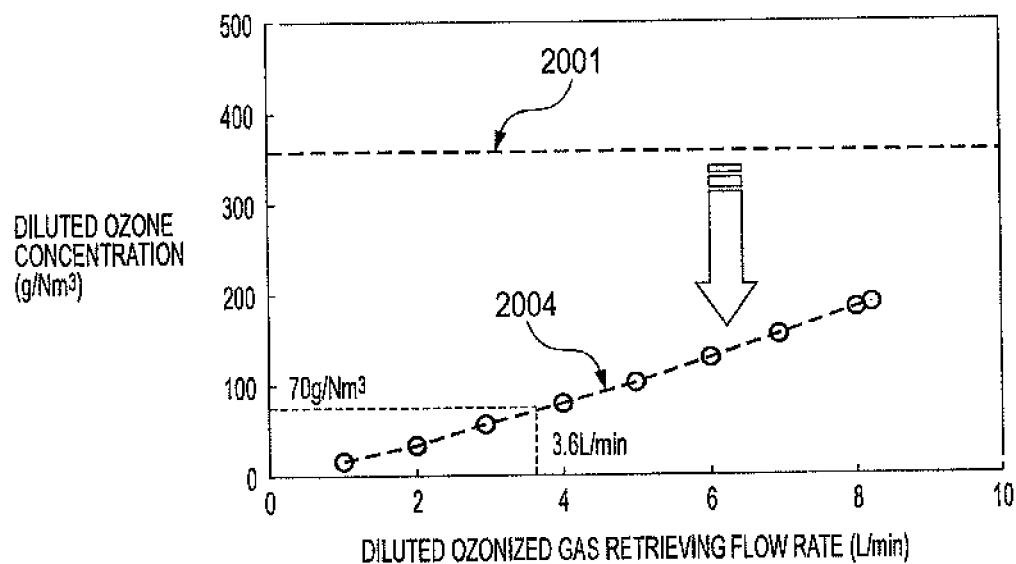
Figure 2D:
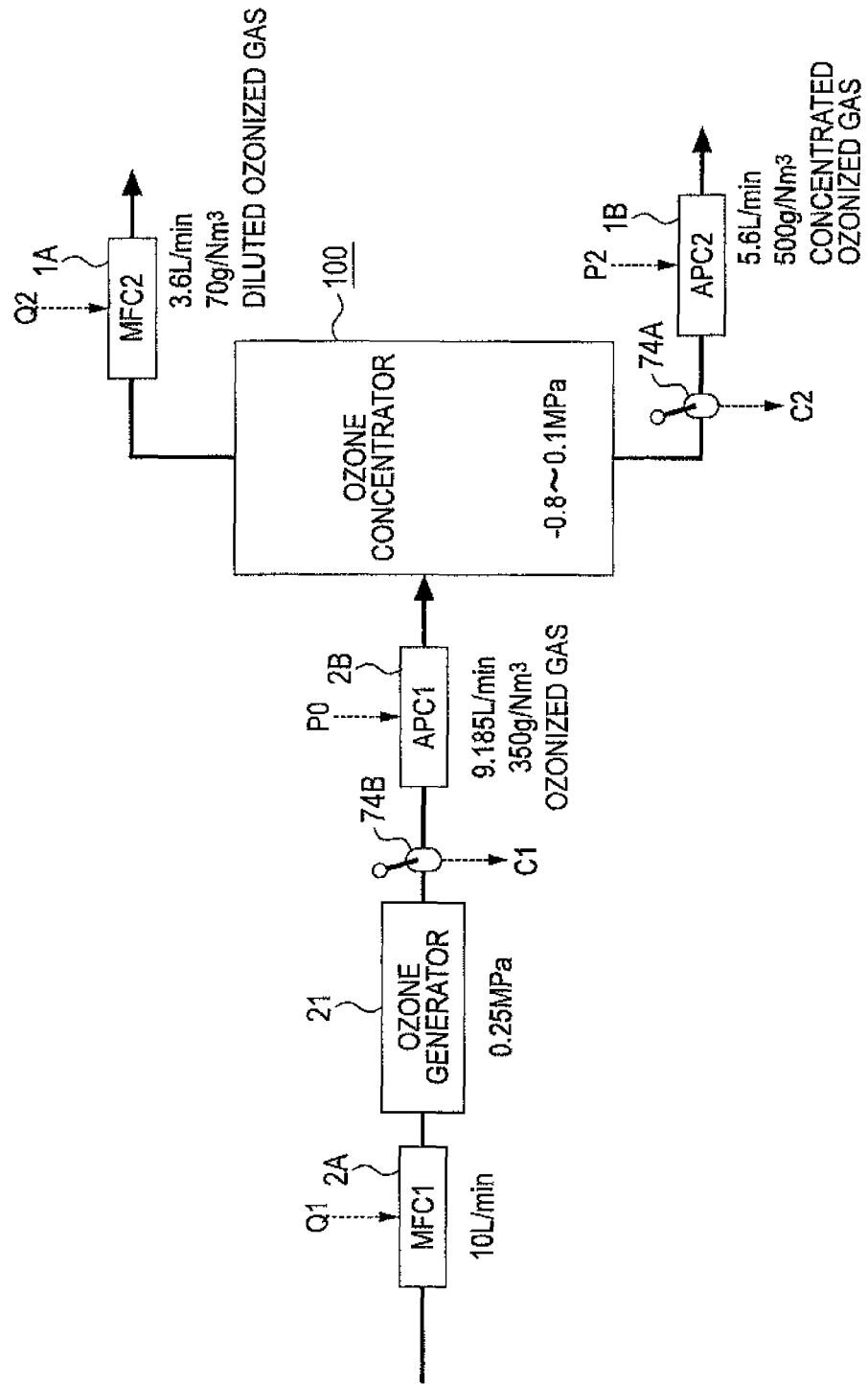

An embodiment 1 of the invention shows an example of an apparatus capable of selectively concentrating or diluting a specific gas (ozone gas) from a gas composition (oxygen gas and ozone gas) generated as an ozonized gas containing an ozone gas in a prescribed concentration in an oxygen gas with an ozone generator with an oxygen gas as a raw material gas. The embodiment 1 of the invention will be described with reference to FIG. 1, FIG. 2-*a*, FIGS. 2-*b* and 2-*c*, FIG. 2-*d* and FIGS. 4-*a* to 6. FIG. 1 is a system block diagram of an ozone gas concentrating device showing the entire ozone concentrating system of the embodiment 1, in which an ozone gas as the specific gas is selectively condensed, and condensed ozone is vaporized (to an ozone gas). FIG. 2-*a* is a schematic illustration showing the principle of ozone concentration in the embodiment 1. FIGS. 2-*b* and 2-*c* is a characteristic diagram where the gases having ozone concentrated and ozone diluted are retrieved in the embodiment 1. FIGS. 2-*b* and 2-*c* show, as an example, a design concentrated ozone concentrating characteristics (A) and a design diluted ozone concentrating characteristics (B) with respect to the flow rate of the ozonized gas capable of being retrieved upon inputting an ozone gas having an ozone flow rate of 9.2 L/min and an ozone concentration of 350 g/Nm$^3$ to an ozone concentrating chamber 1 of the invention.

Figure 4A:
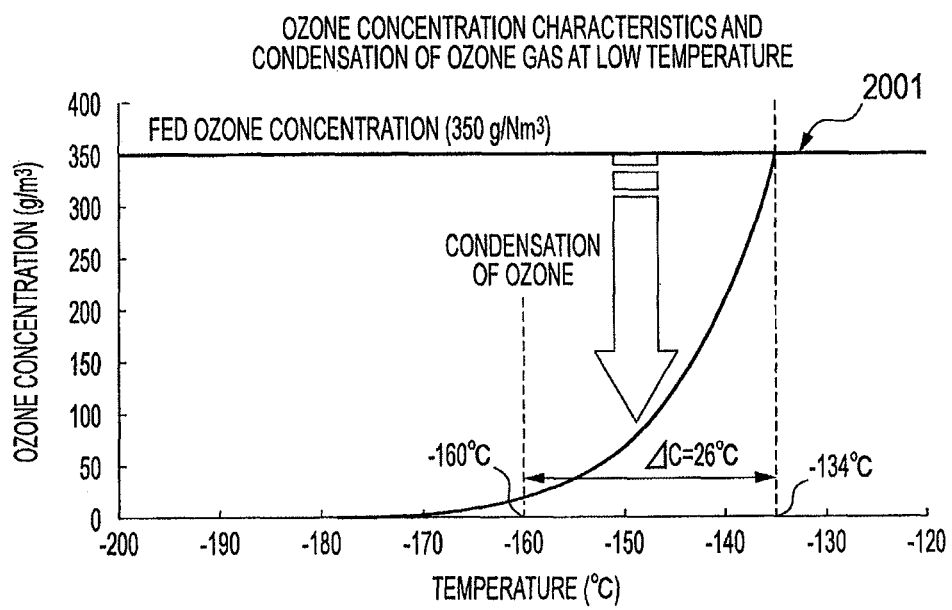
FIGS. 4-*a* and 4-*b* is a characteristic diagram showing a gas temperature of the ozone concentrating chamber and condensation characteristics and vaporization characteristics of an ozone gas in the embodiments 1 and 2 (selective condensation of an ozone gas) of the invention.
Figure 4B:
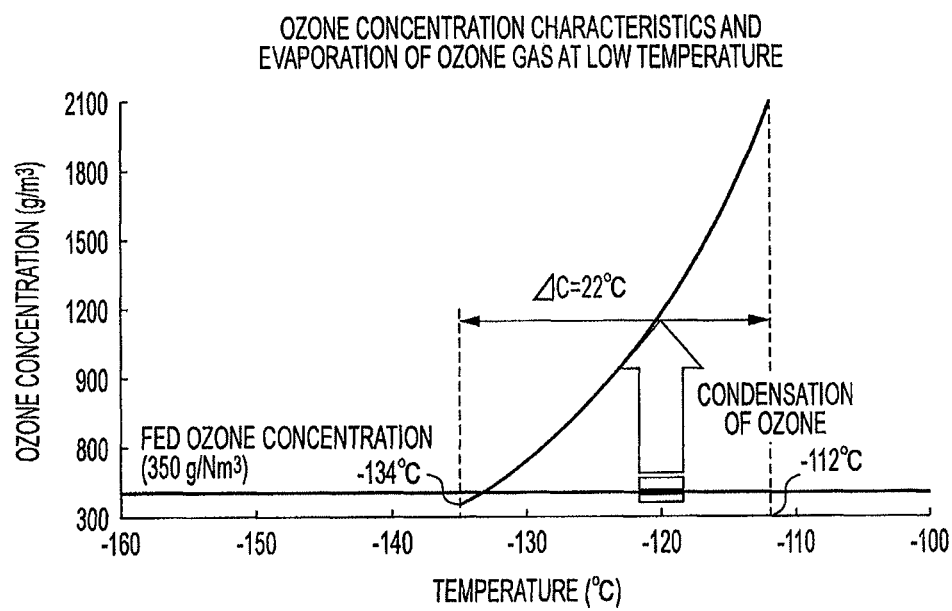
Figure 5:
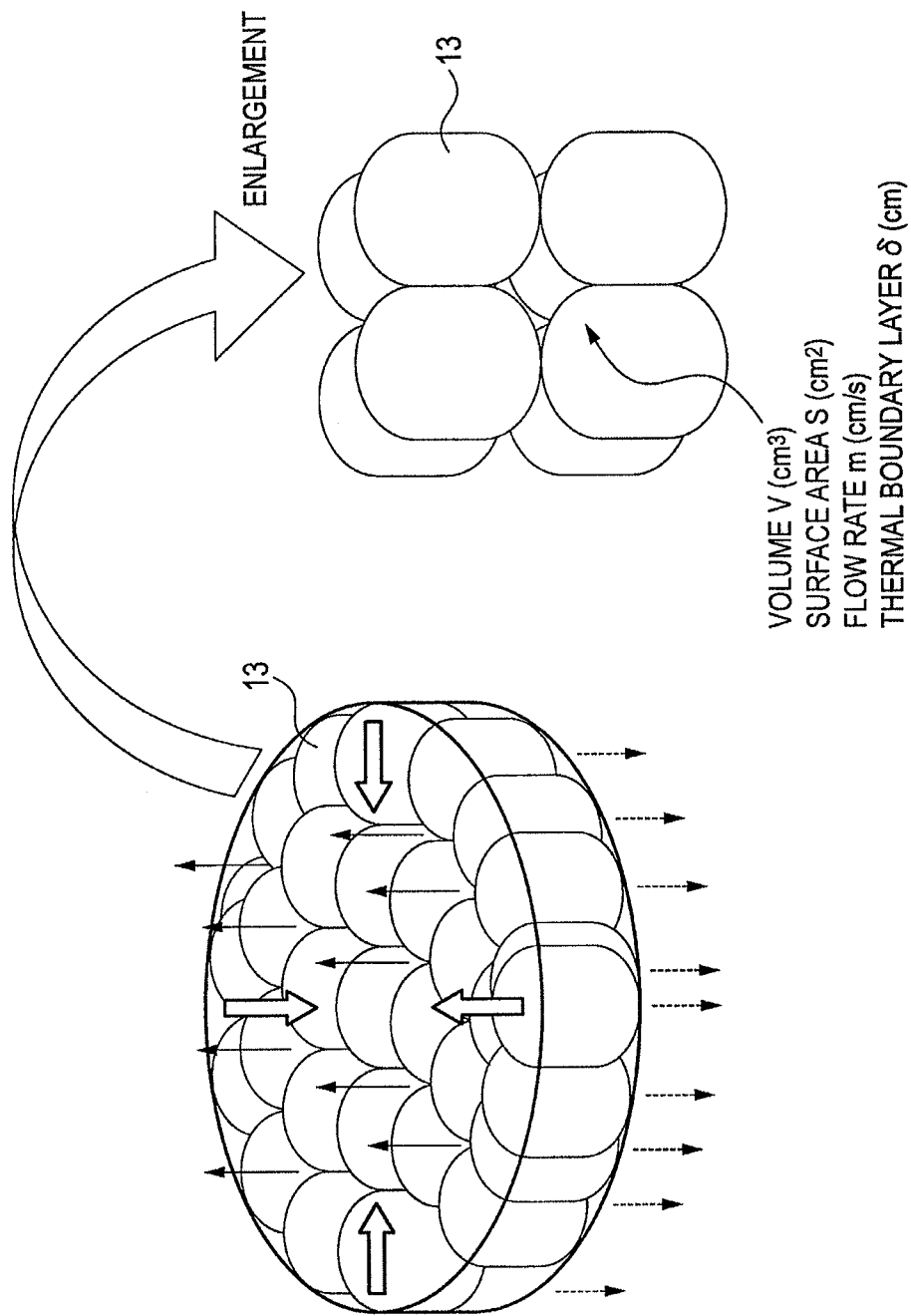
FIG. 5 is an illustration showing the structure and constitution of a particle material for condensation and vaporization for condensing an ozone gas in an ozone concentrating chamber to separate into a diluted oxygen gas and liquefied ozone in the embodiments 1 and 2 (selective condensation of an ozone gas) of the invention.

FIG. 2-*d* is a block diagram showing the gas pressure balance and the gas distribution mechanism for concentrating the fed ozone gas and retrieving the diluted gas upon feeding the ozone gas to the ozone concentrating system of the invention. FIGS. 4-*a* and 4-*b* are ozone vapor pressure characteristic diagrams, in which (a) show a temperature condition range where ozone of the fed ozonized oxygen gas is condensed, and (b) show a temperature condition range where condensed ozone is vaporized. FIG. 5 is an illustration showing the structure and constitution of the particle material for condensation and vaporization that is filled in the chamber for condensing an ozone gas to flow condensed ozone to the lower part and to separate the diluted ozonized gas to the upper part.

Figure 6:
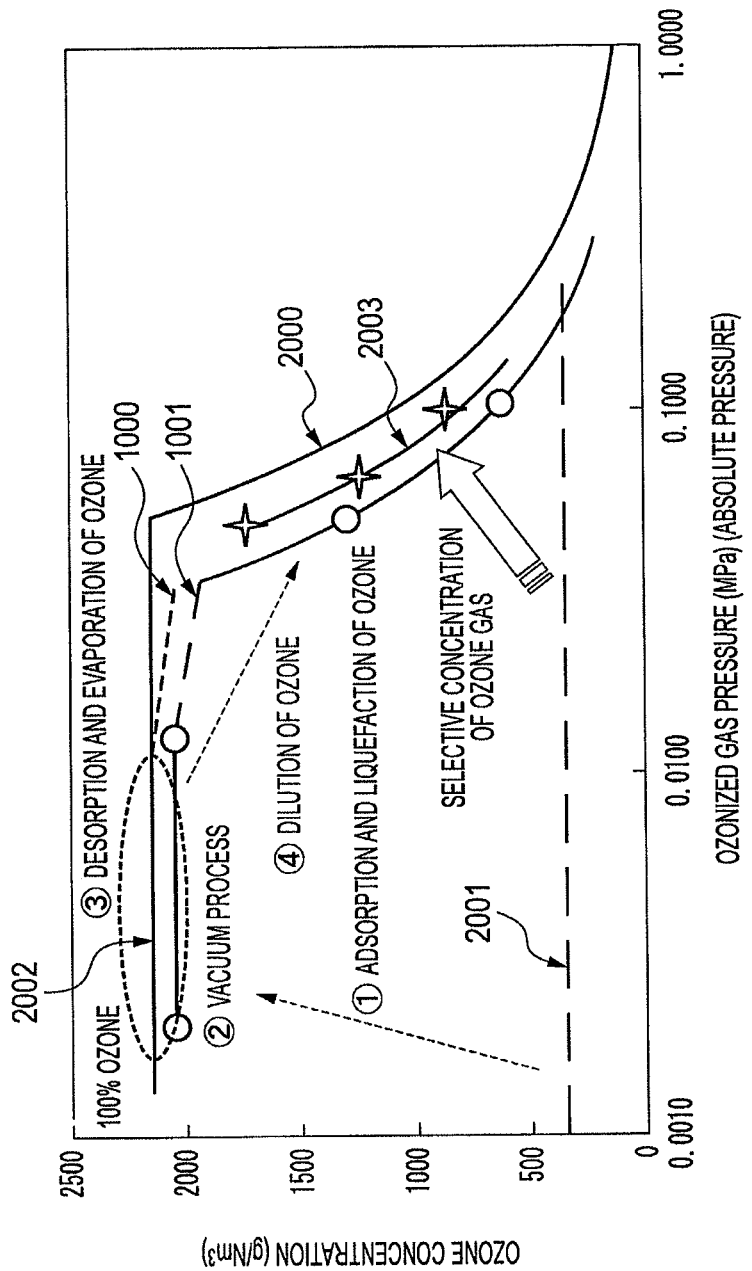
FIG. 6 is a diagram showing a usable ozone concentration region with respect to a pressure of an ozone concentrated oxygen gas, and a relationship between output concentrating characteristics of a conventional concentrated ozonized oxygen gas apparatus and output concentrating characteristics of a concentrated ozonized oxygen gas apparatus of the embodiments 1 and 2 of the invention.

FIG. 6 shows the explosion limit characteristics of an ozone gas concentration with respect to the gas pressure, and the gas pressure-ozone concentration characteristics showing the conventional ozone concentrating characteristics and the ozone concentrating characteristics of the invention.

The ozone concentrating system as an embodiment of the invention is effective particularly in the case where an oxide film with high quality is necessarily formed with a clean ozone gas having a high ozone gas concentration of from about 200,000 ppm (428 g/Nm$^3$) to 350,000 ppm (750 g/Nm$^3$) and an ozone gas suppressed in byproducts, such as NOx.

The ozone concentrating system as an embodiment of the invention will be described. In FIGS. 1 and 2-*a*, an oxygen gas is fed to an ozone generating system 200 from a raw material gas cylinder 4 for generating an ozone gas mainly containing at least oxygen. In the ozone generating system 200, for example, ozonized oxygen of about 163,000 ppm (350 g/Nm$^3$) is generated. The ozone concentrating system 100 is constituted by two ozone concentrating chambers 11 and 12, a metallic cooling plate 15 disposed at an upper part of the ozone concentrating chambers 11 and 12 to surround them, a freezing machine 14 disposed on the outer periphery of the metallic cooling plate 15 for cooling the ozone concentrating chambers 11 and 12 to a temperature where ozone is condensed, and a heat retention material 16 disposed further surrounding them for maintaining a temperature where condensed ozone is vaporized.

Two temperature distributions, i.e., the temperature where ozone is condensed, and the temperature where ozone is vaporized, can be constituted in the upper part and the lower part of the ozone concentrating chambers 11 and 12, as described above. The ozone concentrating chambers 11 and 12 are filled with a large number of pieces of a particle member 13 for condensation and vaporization, and the ozonized oxygen gas generated in the ozone generator 21 is fed from substantially the center part of the ozone concentrating chambers 11 and 12, and gas retrieving ports 20 and 22 are provided on the upper end and the lower end for separating the fed ozonized oxygen gas into two directions, i.e., the direction to the upper part and the direction to the lower part.

An automatic back pressure controller (APC) 1B controlling consistently the pressure in the ozone concentrating chambers 11 and 12 to a constant value is provided at the lower gas retrieving port 22, so as to retrieve ozonized oxygen (concentrated ozone gas). A mass flow rate controller (MFC) 1A capable of automatically controlling the flow rate upon retrieving the gas in the ozone concentrating chambers 11 and 12 is provided at the upper gas retrieving port 20, so as to retrieve ozonized oxygen (diluted ozone gas) at a constant flow rate.

In the ozone concentrating chambers 11 and 12, since the surface of the particle member 13 for condensation and vaporization filled in the chambers is cooled to a temperature where an ozone gas is condensed, the ozonized oxygen gas having been separated upward is cooled to condense an ozone gas selectively on the surface of the particle member 13 for condensation and vaporization in the upper part with the gas temperature being decreased, whereby an oxygen-rich gas (diluted ozonized oxygen gas), which is not condensed on the surface of the particle member 13 for condensation and vaporization, can be retrieved from the upper part. Ozone having been condensed on the surface of the particle member 13 for condensation and vaporization in the upper part of the ozone concentrating chambers 11 and 12 grows to a liquid that exceeds the surface tension of the particle member for condensation and vaporization, and then flows downward by gravitation along the surface of the particle member 13 for condensation and vaporization. The liquefied ozone flowing downward is vaporized since the surface temperature of the particle member for condensation and vaporization in the lower part is increased to the vaporization temperature, and vaporized ozone is added to the ozonized oxygen gas separated to the lower part of the chambers, whereby an ozone-rich gas (concentrated ozonized oxygen gas) can be retrieved from the lower part.

The detailed constitutions and means of the freezing machine 14 for cooling the surrounding of the ozone concentrating chambers 11 and 12 and the heat retention material 16 are schematically shown in the figure, and peripheral facilities are omitted from the figure. While the heat retention material 16 is shown in the figure symbolically as a thermal insulating material, the heat retention material 16 is constituted by adding a vacuum thermal insulation system. Numeral 17*d* denotes an emergency valve for discarding the entire ozonized oxygen gas in the ozone concentrating chambers without concentrating, and the gas flows in the piping path to the waste ozone apparatus (which is not shown in the figure) by bypassing the piping path of the mass flow rate controller 1A. Numeral 71 denotes a thermocouple for measuring the temperature of the metallic cooling plate 15.

Numeral 73 denotes a pressure gage for monitoring the pressure in the ozone concentrating chambers 11 and 12. Numeral 74A denotes an ozone concentration detector for the ozone concentrated gas, and 74B denotes an ozone concentration detector for the ozonized gas fed from the ozone generator 21.

Numeral 9 denotes a total controlling system of the ozone concentrating system setting the ozone raw material gas flow rate Q1, the ozone generator pressure P0, the diluted ozonized gas flow rate Q2 and the inner pressure P2 of the ozone concentrating chambers, monitoring the temperature of the cooling plate 15, the ozone concentration of the fed ozonized oxygen gas, the concentrated ozone concentration, and the inner pressure of the ozone concentrating chambers, controlling switching of the valves for inputting and outputting of the ozone concentrating chambers 11 and 12, displaying the concentrations and the flow rates of the respective parts, and sending signals to the outside. Numerals 7A and 7B denote vacuum evacuating devices for making negative pressure for the gas pressure of the ozone processing system 300 and the ozone concentrating system 100, and 35 and 36 denote pressure gages for matching the gas pressures of the concentrated gas retrieving port 22 and the diluted gas retrieving port 20 of the ozone concentrating system 100.

The function and operation of the ozone concentrating system of the embodiment 1 of the invention will be described. Under the state where the valve 17a provided in the vicinity of the gas feeding port 10 at the center part of the ozone concentrating chambers 11 and 12 is closed, the ozone concentrating chambers 11 and 12, the ozone processing chamber 3 and the gas piping system are evacuated to vacuum with the vacuum evacuating devices 7A and 7B to remove the gas remaining inside and to remove impurities. For the operation, the valves 17b, 17c and 17d of the ozone concentrating system 100, the valve of the ozone processing system 300, and the flow rate controlling valves 31, 32, 33 and 34 are fully opened.

The mass flow rate controller (MFC) 1A and the automatic pressure controller (APC) 1B are also opened. The freezing machine 14 provided on the outer periphery of the ozone concentrating chambers 11 and 12 is operated to freeze the chambers to the prescribed temperature ranges, respectively. The metallic cooling plate 15 provided on the outer periphery of the ozone concentrating chambers 11 and 12 has a structure having good thermal conductivity and exerting freezing capability sufficiently since it is cooled around an extremely low temperature. In order to maintain the upper part of the ozone concentrating chambers 11 and 12 to a temperature where ozone can be selectively condensed (for example, from −134 to −160° C.), the thermal insulating material 16 has a large thickness. In order to maintain the lower part of the ozone concentrating chambers 11 and 12 to a temperature (for example, from −134 to −112° C.) higher than the cooling temperature of the upper part, the thermal insulating material 16 has a small thickness.

After sufficiently evacuated to vacuum, and confirming that the ozone concentrating chambers 11 and 12 are cooled to the prescribed cooling temperature ranges, with the pressure gage 73 and the thermocouple 71, the flow rate controlling valves 32 and 33 of the ozone processing system. 300 are closed to maintain vacuum the interior of the ozone processing chamber 3. In the state where the flow rate controlling valve 17d on the diluted gas retrieving port 20 of the ozone concentrating system 100 is fully closed, the valve 17a, which is the ozonized gas feeding port 10, of the ozone concentrating system 100 is opened to feed 10 L/min of an oxygen gas to the ozone concentrating chambers 11 and 12 of the ozone concentrating system from the oxygen cylinder 4 through the ozone generating system 200, and to discharge to the waste ozone processing apparatus 5 and the processed gas decomposing chamber 8.

In the ozone generating system 200, the oxygen gas flow rate is controlled to an oxygen gas flow rate of 10 L/min with the mass flow rate controller 2A, and the gas pressure in the ozone generator 21 is controlled to a constant value of 0.25 MPa with the automatic pressure controller 2B.

In the ozone concentrating system 100, the gas flow rate at the diluted gas retrieving port is set to 3.6 L/min with the mass flow rate controller 1A, and the gas pressure in the ozone concentrating chambers 11 and 12 is set to a negative pressure of −0.5 MPa (about 380 Torr) with the automatic pressure controller 1B at the concentrated gas retrieving port 22, whereby an oxygen gas of 6.4 L/min flows at the concentrated gas retrieving port 20 and is discharged to the processed gas decomposing chamber 8 through the bypass piping path of the ozone processing system 300.

After setting to the state where an oxygen gas can be continuously fed, an alternating electric current is applied to the ozone generator 21 of the ozone generating system 200 to effect silent electric discharge, whereby an ozonized oxygen gas having a flow rate of about 9.185 L/min and an ozone concentration of 350 g/Nm$^3$ is generated with the ozone generator 21 and fed to the ozone concentrating chambers 11 and 12. According to the operation, the ozonized oxygen gas is separated and continuously fed to the diluting side at 3.6 L/min and to the concentrating side at 5.6 L/min. The surface temperature of the particle material 13 for condensation and vaporization has become a low temperature sufficient for selectively condensing ozone. Accordingly, only ozone contained in 350 g/Nm$^3$ of the ozonized oxygen gas fed to the diluting side (upper part of the concentrating chambers 11 and 12) is condensed on the surface of the particle material 13 for condensation and vaporization filled in the ozone concentrating chambers 11 and 12, whereby a diluted ozonized oxygen gas 19 is formed in the upper part of the concentrating chambers 11 and 12.

Ozone thus condensed on the surface of the particle material 13 for condensation and vaporization grows to liquid ozone on the surface of the particle material 13 since the ozonized oxygen gas is continuously fed. The grown liquid ozone flows downward to the lower part by gravitation along the surface of the particle material 13 for condensation and vaporization since the surface thereof is a smooth surface without unevenness. The liquid ozone thus flowing downward to the lower part is made in contact with the particle material 13 for condensation and vaporization filled in the lower part of the ozone concentrating chambers 11 and 12. Since the surface temperature of the particle material 13 for condensation and vaporization in the lower part of the ozone concentrating chambers 11 and 12 is set at a high temperature sufficient for vaporizing liquid ozone, liquid ozone is vaporized from the surface of the particle material 13, and the vaporized ozone gas is added to the ozonized oxygen gas flowing in the lower part of the ozone concentrating chambers 11 and 12, whereby a concentrated ozonized oxygen gas 18 is formed.

Condensation of a gas depends on a temperature of the gas and a temperature of a substance, to which the gas adsorbed, and in physical sense, when the gas temperature becomes equal to or lower than the saturated vapor pressure temperature, a gas exceeding the saturated vapor amount is condensed. Condensation of a gas also depends on the adsorbed amount of the substance, to which the gas is adsorbed, and in the case where the substance, to which the gas is adsorbed, is miniaturized to increase the surface area of the substance, such an effect is obtained that the gas can be condensed at a higher temperature than the saturated vapor pressure temperature of the gas. For example, an ozone gas is condensed at about from −112 to −134° C. of the saturated vapor pressure characteristics, but in the case where the substance is miniaturized, it can be condensed at a high temperature range of from 0 to −100° C. Accordingly, in the case where the particle material 13 for condensation and vaporization of the embodiment 1 of the invention is miniaturized, it can be condensed at a high temperature range (0 to −100° C.) to make higher the cooling temperature of the freezing machine, whereby an ozone gas can be condensed with a general purpose freezing machine, the freezing machine can be reduced in size, the thermal insulating material and the like of the chambers can be thinned, and thus the entire apparatus can be inexpensive.

The concentrated ozonized oxygen gas 18 and the diluted ozonized oxygen gas 19, which are concentrated and diluted at the upper and lower parts of the ozone concentrating chambers 11 and 12, thus separated are retrieved from the retrieving ports therefor to the outside through the ozone concentration meter 74A, the automatic pressure controller 1B, and the mass flow rate controller 1A. After confirming that the concentrated ozonized oxygen gas 18 has been stably concentrated to a prescribed ozone concentration with the ozone concentration meter 74A, the controlling valves 32 and 34 of the bypass piping path of the ozone processing system 300 are fully closed, and the controlling valves 31 and 33 for feeding to the ozone processing chamber 3 are opened, whereby the concentrated ozone gas is diffused in the entire ozone processing chamber 3 through adiabatic expansion.

The pressure in the ozone processing chamber 3 is managed and adjusted with the pressure gage 35 and the valve 33, and the ozone process is effected after making the temperature of the material to be processed (such as a wafer) in the ozone processing chamber 3 to a processing temperature, whereby an oxide thin film with high quality can be obtained on the surface of the material to be processed (such as a wafer).

Devices of the ozone concentrating system, apparatuses, valve operations and detailed signal lines of sensors are not apparently shown herein, but the aforementioned operations can be totally controlled and monitored with the controlling system 9.

FIGS. 2-b and 2-c show the ozone concentrating characteristics of the concentrated oxygen gas and the diluted oxygen gas retrieved from the ozone gas concentrating system of the embodiment 1 of the invention with respect to the flow rates thereof, respectively. In the figures, the characteristic curve 2001 shows the ozone concentration fed from the ozone generating system 200 to the ozone concentrating system 100. The characteristic curve 2003 shows the concentrated ozone concentrating characteristic to the ozonized oxygen gas flow rate retrieved from the lower part of the ozone concentrating chambers, the characteristic curve 2004 shows the diluted ozone concentrating characteristic to the ozonized oxygen gas flow rate retrieved from the upper part of the ozone concentrating chambers.

As the design values of the embodiment, the fed raw material flow rate is 10 L/min, a gas of an ozone concentration of 350 g/Nm$^3$ and a flow rate of about 9.2 L/min as the ozonized gas generated from the ozone generating system 200 is input to the ozone concentration system 100, a diluted ozonized oxygen gas diluted to 70 g/Nm$^3$ at a flow rate of 3.6 L/min is retrieved from the upper part of the ozone concentrating system 100, and a concentrated ozonized oxygen gas concentrated to 500 g/Nm$^3$ at a flow rate of 5.6 L/min is retrieved from the lower part of the ozone concentrating system.

FIG. 2-d is a block diagram showing the gas pressure balance and the gas distribution mechanism of the aforementioned ozone concentrating system of the invention.

In the figure, numeral 2A denotes a mass flow rate controller MFC1 controlling the flow rate of the raw material gas fed to the ozone generator 21, 2B denotes an automatic back pressure controller APC1 controlling the pressure in the ozone generator 21 to a constant pressure (for example, 0.25 MPa) to control output of the ozonized oxygen gas, 1A denotes a mass flow rate controller MFC2 capable of controlling the flow rate Q2 of the diluted gas retrieved from the ozone concentrating system 100, and 1B denotes an automatic back pressure controller APC2 controlling the gas pressure in the ozone concentrating system 100 to a prescribed pressure consistently.

For example, upon setting the prescribed pressure P2 to −0.05 MPa (about 380 Torr) with APC2 (1B), when the gas pressure in the ozone concentrating chambers is set to a constant value of −0.05 MPa (about 380 Torr), and the flow rate of the diluted ozonized oxygen gas is se to 3.6 L/min with the mass flow rate controller (MFC2), the ozone concentration of the diluted ozonized oxygen gas is diluted from 350 g/Nm$^3$ to 70 g/Nm$^3$, and the diluted ozonized oxygen gas is ozone-processed with the waste ozone processing apparatus 5 and discharged to the outside. The flow rate of the concentrated ozonized oxygen gas output from the lower part of the ozone concentrating system 100 and APC2 (1B) is 5.6 L/min, and an ozonized oxygen gas concentrated from 350 g/Nm$^3$ to 500 g/Nm$^3$ can be continuously retrieved.

As shown in FIG. 2-c, when the flow rate of the diluted ozonized gas retrieved from MFC2 (1A) is increased, the amount of ozone condensed from the ozone gas in the ozone concentrating system is increased, APC2 (1B) automatically controls to maintain the constant pressure in the ozone concentrating system, the flow rate of the concentrated ozonized oxygen gas output from the lower part of the ozone concentrating chambers is decreased, and the ozone amount thus condensed is vaporized at the lower part of the ozone concentrating chambers to form an ozone gas, whereby the operation functions to retrieve an ozonized gas having been concentrated to a high concentration from the lower part.

The ozonized oxygen gas having an ozone concentration of 350 g/Nm$^3$ obtained from the ozone generating system 200 is cooled to condense ozone on the surface of the particle material 13 for condensation and vaporization filled in the ozone concentrating chambers 11 and 12, such a low temperature is necessary that is equal to or lower than the temperature of the saturated vapor pressure of an ozone concentration of 350 g/Nm$^3$ (163,333 ppm). For the temperature where ozone is condensed, when a low temperature of from −134 to −160° C. is provided, an ozonized oxygen gas having an ozone concentration of 350 g/Nm$^3$ can be sufficiently condensed, as shown by the arrow in FIG. 4-a. In the case where the particle material 13 for condensation and vaporization is miniaturized, it can be condensed at a high temperature range (from 0 to −100° C.), and thus the cooling temperature of the freezing machine can be increased.

In order to vaporize the condensed ozone gas under the ozonized oxygen gas having an ozone concentration of 350 g/Nm$^3$ flowing, a temperature of from −112 to −134° C. higher than the condensing temperature is provided, as shown by the arrow in FIG. 4-b. Since upon rapidly increasing the temperature of condensed ozone, liquefied ozone is vaporized almost instantaneously to form heat due to rapid increase in pressure in the ozone concentrating chambers and decomposition ozone associated therewith, it is desirable that the temperature is gradually increased to vaporize ozone.

As having been described, a part having a temperature range (for example, from −134 to −160° C.) where ozone can be selectively condensed from an ozonized oxygen gas and a part having a temperature range (for example, from −134 to −112° C.) where condensed ozone can be vaporized are formed in one ozone concentrating chambers, and condensed ozone is moved by utilizing flow of liquid and gravitation to the part where condensed ozone can be vaporized, and then vaporized, whereby an ozonized oxygen gas having an ozone concentration of 350 g/m$^3$ can be further increased in ozone concentration. Furthermore, in the case where the particle material 13 for condensation and vaporization is miniaturized, it can be condensed at a high temperature range (from 0 to −100° C.), whereby the cooling temperature of the freezing machine can be increased.

The particle material 13 for condensation and vaporization filled in the ozone concentrating chambers 11 and 12 has a special shape of a special shape with multifaceted planes on side surfaces, as shown in FIG. 5. Upon filling the particle material 13 for condensation and vaporization is filled in the ozone concentrating chambers 11 and 12, each pieces of the particle material 13 for condensation and vaporization are in contact with each other through planes in the radial direction of the chambers to form a structure having large thermal conduction. In the axial direction, each pieces of the particle material 13 for condensation and vaporization are contact with each other through points or are disposed with gaps, whereby thermal conduction in the axial direction is considerably small.

In the case where the particle material 13 for condensation and vaporization is filled in the ozone concentrating chambers 11 and 12 in this manner, the ozone concentrating chambers 11 and 12 can be cooled with a considerably flat temperature distribution in the radial direction of the chambers by cooling the ozone concentrating chambers 11 and 12 from the periphery thereof with the freezing machine 14. Accordingly, the ozonized oxygen gas passing through the particle material 13 for condensation and vaporization is uniformly cooled, whereby an ozone gas can be selectively condensed on the surface of the particle material for condensation and vaporization with high efficiency. Since the particle material for condensation and vaporization has a spherical shape, condensed ozone flows downward by gravitation along the spherical surface. The liquid ozone flows downward, and since the particle material 13 for condensation and vaporization filled in the lower part is set at a high temperature, the liquid ozone along the surface of the particle material 13 for condensation and vaporization is vaporized to realize a high concentration of the ozonized oxygen gas (ozone concentration), thereby retrieving the concentrated ozonized oxygen gas from the lower part.

Not only the particle material 13 for condensation and vaporization has large thermal conduction in the radial direction owing to the special shape, but also, while not shown in the figure, the particle material 13 for condensation and vaporization is formed with glass, ceramics or a resin material, which is a substance having a small thermal conductivity, and has a metal of thickness 1 mm or less having a high thermal conductivity vapor-deposited on the surface thereof. According to the constitution, only the metallic part vapor-deposited on the surface of the particle material for condensation and vaporization having a small thermal capacity can be cooled preferentially, and thus condensation and vaporization of a gas can be effected with high efficiency. In the concentrating apparatus of an ozonized oxygen gas of the invention, the material of the metal to be vapor-deposited is preferably a metal having ozone resistance, and gold, platinum or the like are preferably vapor-deposited.

As a method for decreasing the thermal capacity of the particle material 13 for condensation and vaporization having the special shape, it is functionally effective to make hollow the center part of the particle material for condensation and vaporization.

The explosion limit of the ozonized oxygen gas with respect to the gas pressure is disclosed in Patent Document 1 and Non-patent Document 1. It has been said about the explosion limit from these literatures that a 100% ozone gas does not explode under a gas pressure of 0.5 MPa (386 Torr) or less in terms of absolute pressure. In the case where the gas pressure becomes 0.5 MPa (386 Torr) or more in terms of absolute pressure, it has been ordinarily said that the explosion limit of an ozone gas is an ozone concentration exceeding 1,104 g/Nm$^3$ in terms of an atmosphere converted concentration. The explosion limit characteristics with respect to the gas pressure are shown by the characteristic curve 2000 in FIG. 6.

While the explosion limit varies depending on a NOx gas, SOx and a carbonized substance gas contained in the ozonized oxygen gas, a metallic impurity amount and a gas temperature thereof, it is preferred to use in the ozone concentration range within the limit characteristic range.

In FIG. 6, the characteristic curves 1000 and 1001 show the ozone concentrating characteristics by an ozone concentrating method with a conventional liquid ozone apparatus or adsorption apparatus. The characteristic curve 2003 shows ozone concentrating characteristics by the condensation-vaporization method of the invention.

In the ozone concentrating method by a conventional liquid apparatus or adsorption apparatus, the entire amount of an ozone gas to be retrieved is once liquefied or adsorbed in an adsorbing or liquefying step shown by the encircled number 1 in FIG. 6, then the interior of the apparatus is evacuated to vacuum in the vacuum step shown by the encircled number 2, then the apparatus in vacuum is heated for gasifying to form an around 100% ozone gas as in the encircled number 3, and ozone is diluted with a carrier gas as in the encircled number 4, whereby a prescribed concentrated ozonized gas is retrieved. Accordingly, it is necessary to process unnecessary ozone with a waste ozone apparatus in the steps 1 to 3, and thus the ozone concentrating efficiency is as considerably poor as about 40% at most. It is necessary in the step 2 to form high concentration ozone of nearly 100%, and thus such a problem arises that a large protection device is necessary, and the temperature and pressure are necessarily managed sufficiently, for consistently preventing explosion from occurring in the step of forming the high concentration ozone through desorption from the liquefied or adsorbed ozone.

In the ozone concentrating method by the condensation-vaporization of the invention, on the other hand, based on the ozone concentration generated from the ozone generator 21, an ozone gas is condensed in the ozone concentrating chambers 11 and 12, and substantially simultaneously, condensed ozone is vaporized to obtain a high concentration, whereby a gas that has not been concentrated in the ozone gas generated by the ozone generator is only an ozone gas that has not been condensed in the ozone concentrating chambers 11 and 12, and thus ozone can be concentrated with considerably high efficiency. Furthermore, in the apparatus, since the highly concentrating step is effected based on the ozone concentration generated by the ozone generator 21, there is such an advantage that the risk of explosion can be significantly reduced.

That is, condensed ozone is a slight amount of liquid on the surface of the particle material for condensation and vaporization, and upon vaporizing it, it is gradually vaporized at the temperature of the surface of the particle material for condensation and vaporization, and the spatial volume of the particle material for condensation and vaporization is small, whereby there is no risk of accelerating vaporization.

While the ozone concentrating chambers 11 and 12 are each constituted by a single chamber, they each may be constituted by a flange structure containing an upper part and a lower part that are separated to each other and formed of stainless steel. In this case, it is possible that the temperature of the condensation accelerating zone in the upper part and the temperature of the vaporization accelerating zone in the lower part are sufficiently managed, and a thermal insulating flange constituted by ceramics, glass or the like is inserted between the two stainless steel flanges. Furthermore, two freezing machines are separately provided to control the temperatures independently.

Embodiment 2

Figure 7:
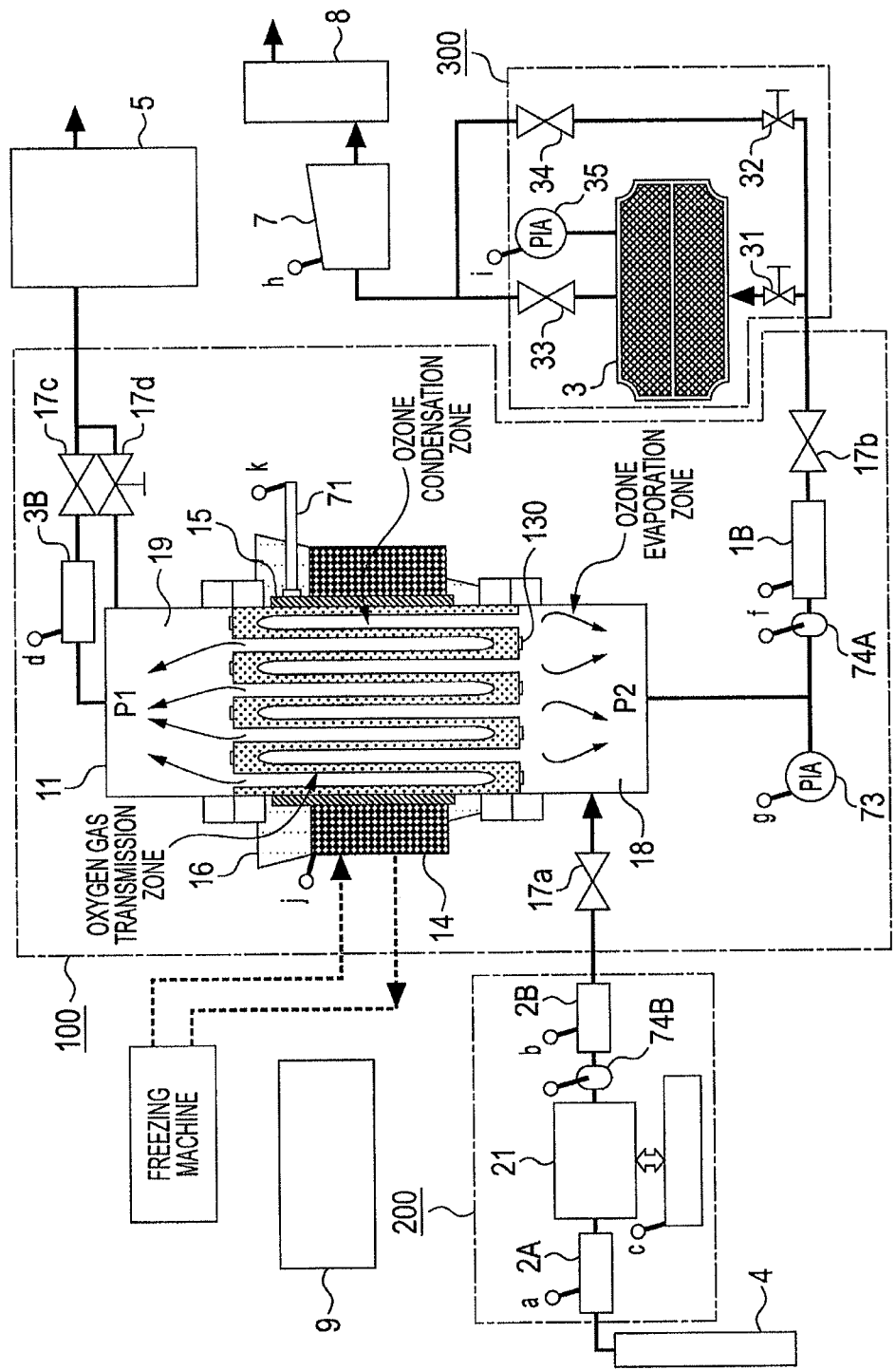
FIG. 7 is a system diagram of an ozone gas concentrating system showing a constitution of ozone gas concentration in another embodiment (selective transmission of an oxygen gas) of the invention.
Figure 8:
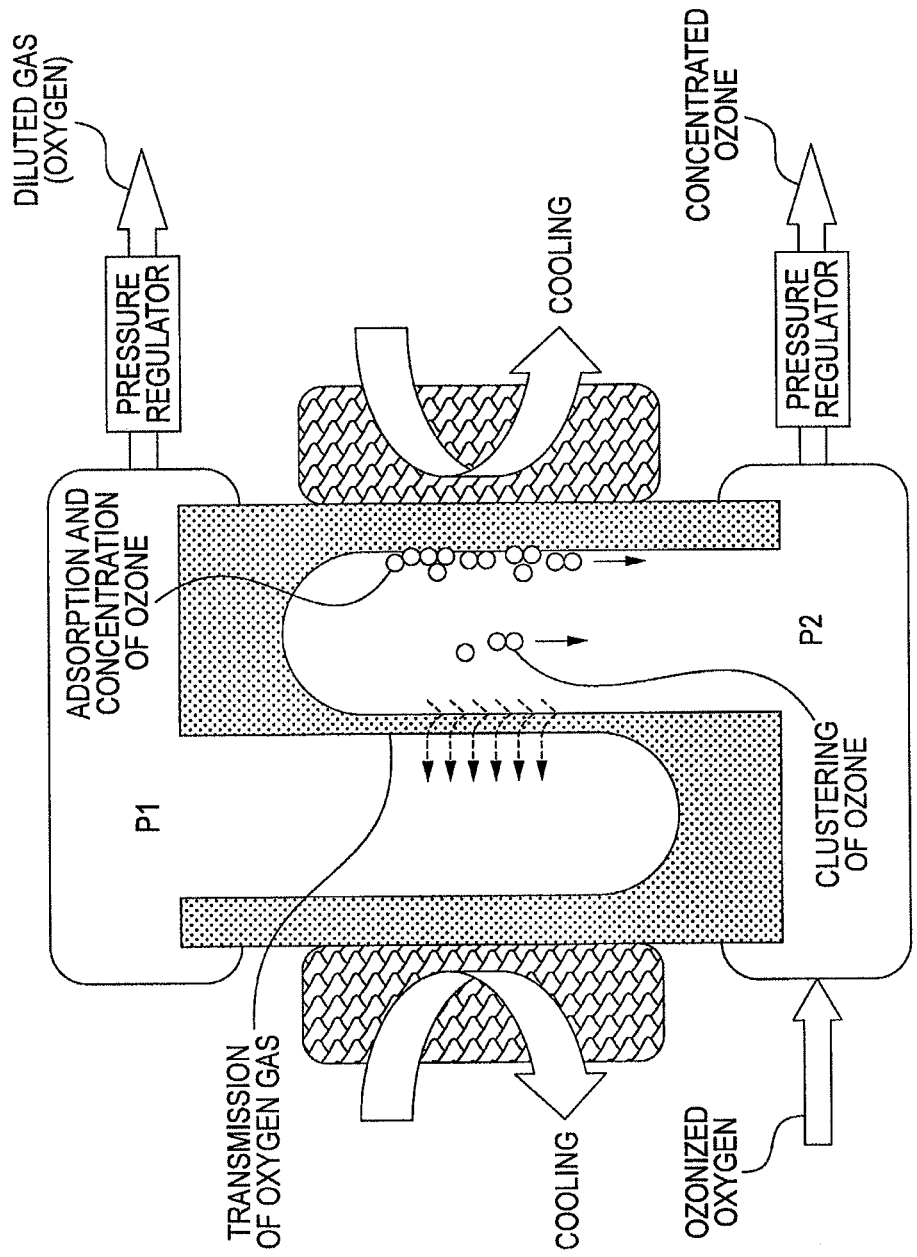
FIG. 8 is a schematic diagram showing a concentration mechanism of an ozonized oxygen gas in another embodiment (selective transmission of an oxygen gas) of the invention, in which an ozonized oxygen gas is fed and separated to an oxygen gas containing an ozone gas having been concentrated and an oxygen gas containing an ozone gas having been diluted.
Figure 9:
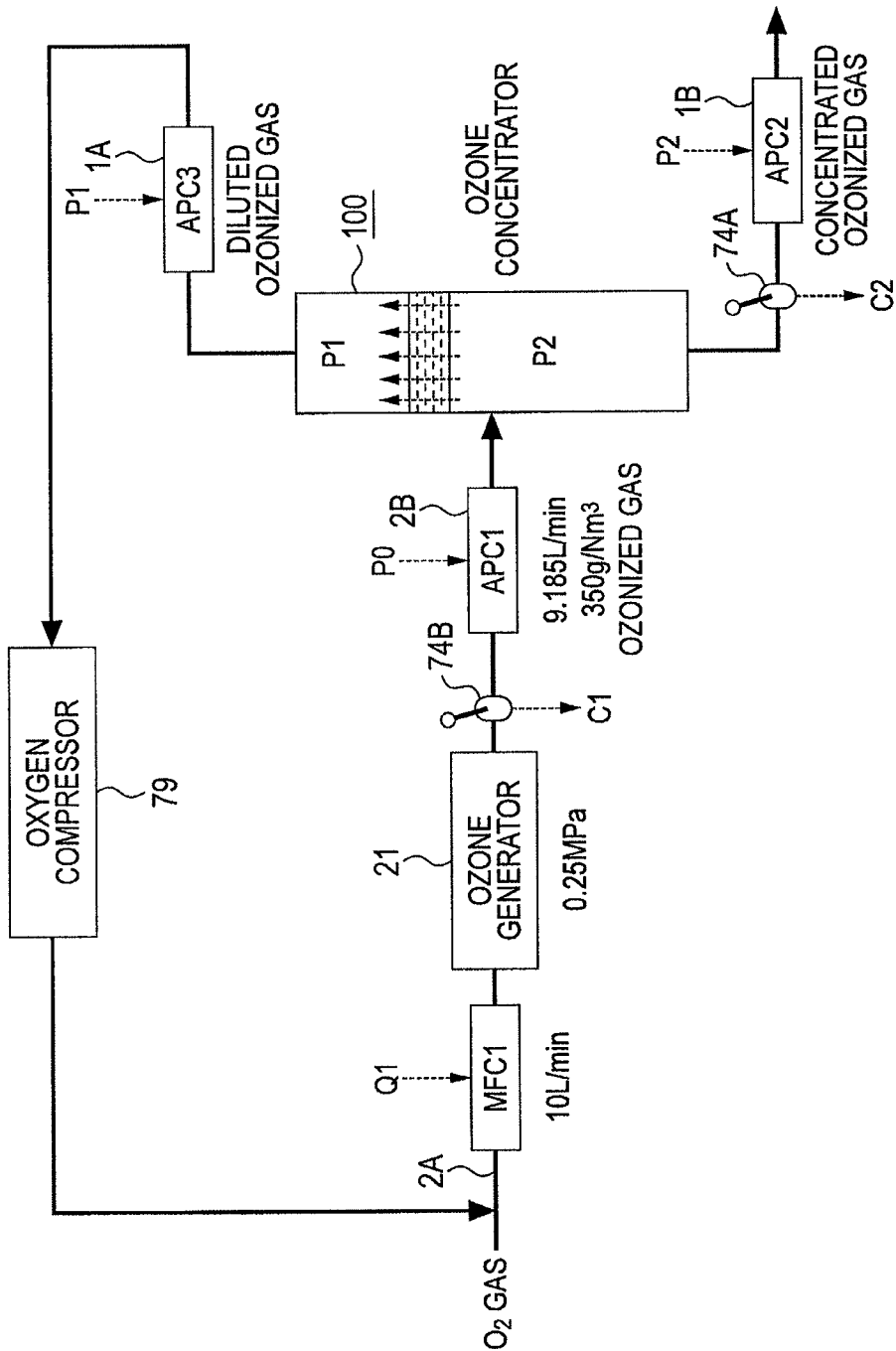
FIG. 9 is a block diagram showing a gas controlling system of an ozone gas concentrating system apparatus showing flow rate control and pressure control in a system of from feed of an ozonized oxygen gas to retrieval of the concentrated oxygen gas and the diluted oxygen gas in the ozone gas concentrating system of another embodiment (selective transmission of an oxygen gas) of the invention.
Figure 10:
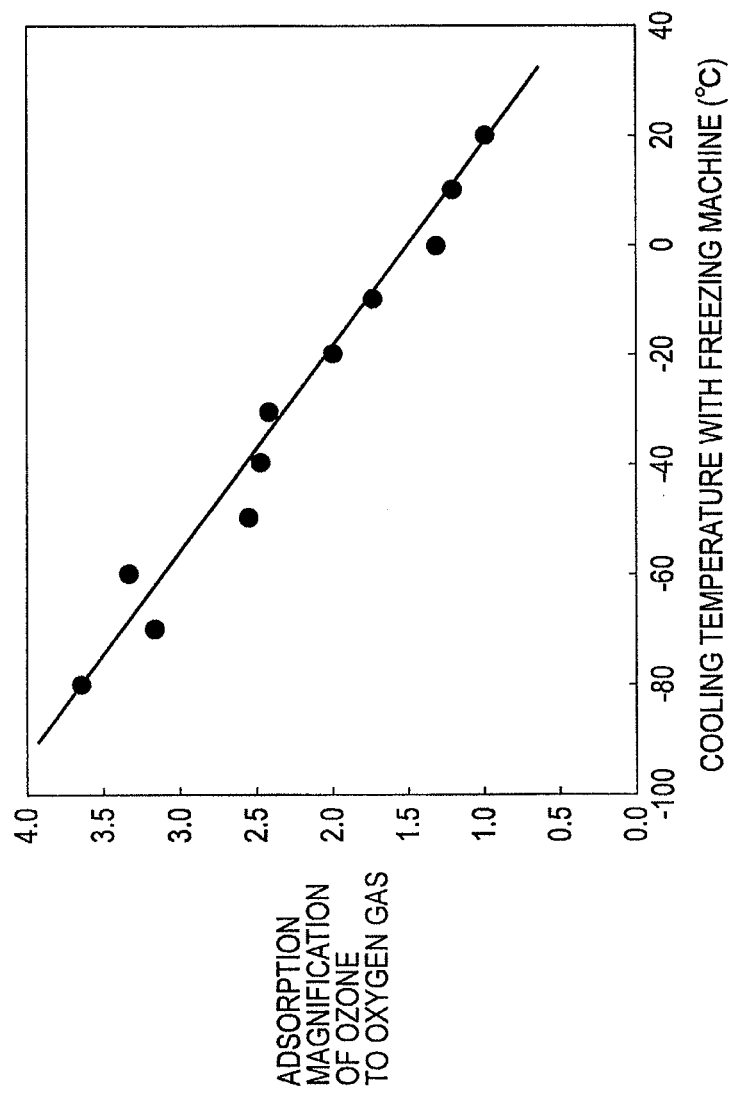
FIG. 10 is a characteristic diagram showing temperature dependency of an adsorbed amount of ozone with respect to an adsorbed amount of an oxygen gas upon cooling a concentrating chamber of an ozone gas concentrating system in the invention.
Figure 11:
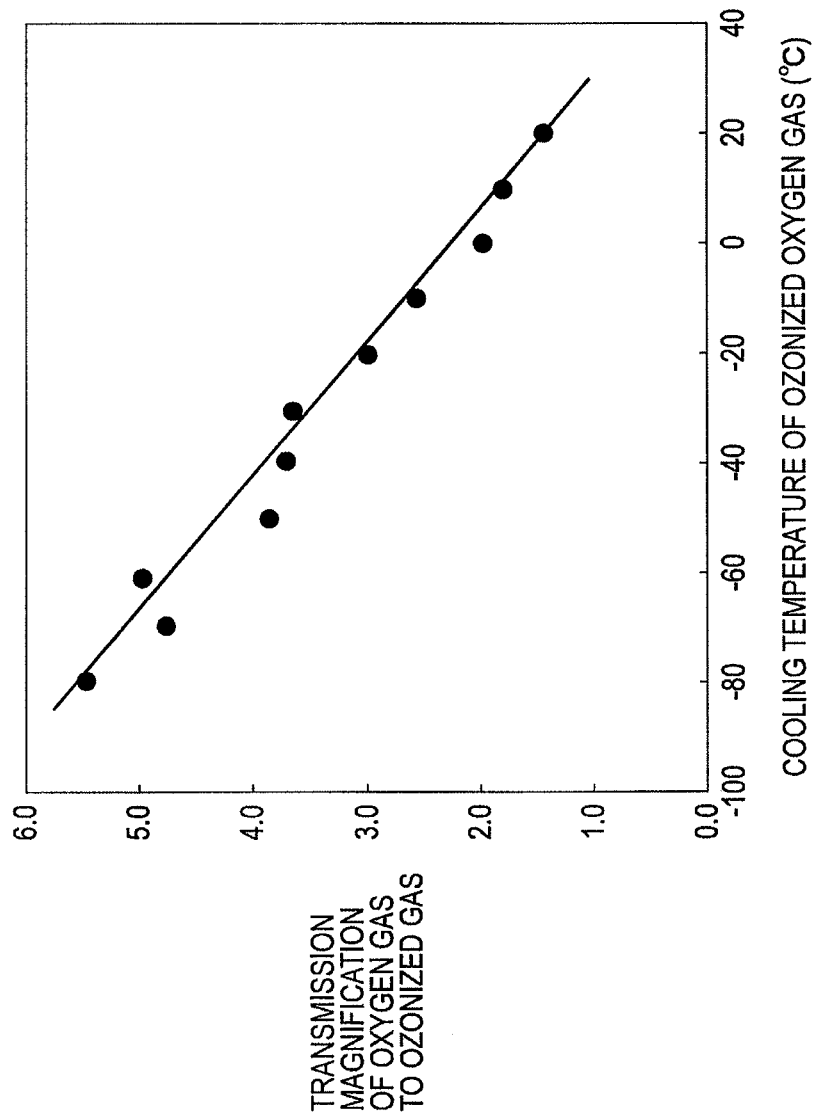
FIG. 11 is a characteristic diagram showing temperature dependency of a magnification of a transmission amount of an oxygen gas with respect to a transmission amount of an ozone gas through a membrane upon cooling a concentrating chamber of an ozone gas concentrating system in the invention.

The embodiment 2 of the invention shows an example of an apparatus capable of selectively concentrating or diluting a specific gas (ozone gas) from a gas composition (oxygen gas and ozone gas) generated as an ozonized gas containing an ozone gas in a prescribed concentration in an oxygen gas with an ozone generator 200 with an oxygen gas as a raw material gas. The embodiment 2 of the invention will be described with reference to FIGS. 7, 8, 9, 10 and 11. FIG. 7 is a system block diagram of an ozone gas concentrating device showing the entire ozone concentrating system, in which an oxygen gas as other gases than an ozone gas is selectively transmitted through a sheet in a thin membrane form to increase the ozone concentration in the ozonized gas, whereby the ozonized gas is concentrated. FIG. 8 is a schematic illustration showing the principle of ozone concentration in the embodiment 2. FIG. 9 is a schematic illustration of an ozone concentrating system, as an example, showing a gas piping and an arrangement of devices in the case where an ozonized gas having an ozone flow rate of 9.2 L/min and an ozone concentration of 350 g/Nm$^3$ (160,000 ppm) is input to the ozone concentrating chamber 100 of the invention. FIGS. 10 and 11 are characteristic diagrams, in which for describing the concentrating mechanism of the invention, the difference in adsorption amount and transmission amount of ozone and oxygen contained in the ozonized gas obtained experimentally is shown in terms of magnification, and the cooling temperature dependency of the magnification is shown.

FIG. 9 is a block diagram showing the gas pressure balance and the gas distribution mechanism for concentrating the fed ozone gas and retrieving the diluted gas upon feeding the ozone gas to the ozone concentrating system of the invention.

In this example, an ozonized gas having a pressure of 0.25 MPa (P0) is fed to the ozone concentrating chamber from the ozone generator, the pressure on the concentrating side of the ozone concentrating chamber is set, for example, to 0.2 MPa (P2), and the pressure on the diluting side is set, for example, to around 0.02 MPa (P1), which is near the atmospheric pressure, whereby the concentrated ozonized gas and the diluted gas are retrieved to the outside. The diluted gas around the atmospheric pressure thus retrieved is increased in pressure, for example, to about from 0.3 to 0.5 MPa with an oxygen compressor 79. Such a constitution is employed that an oxygen gas transmitted in the ozone concentrating system is returned to the raw material gas in the step preceding the ozone generator with the oxygen compressor.

The ozone concentrating system of the embodiment 2 of the invention is a system in which only an oxygen gas is selectively transmitted through a thin membrane, and thus it is particularly effective for concentrating an ozonized gas that has less factors of accelerating deterioration of the membrane. That is, it is particularly effective to the case where a nitrogen-free ozone generator having no nitrogen added is used as the ozone generator, and the ozonized gas output from the ozone generator contains byproducts, such as NOx, in an amount as small as possible.

The ozone concentrating system of the embodiment 2 of the invention is particularly effective for the case where it is necessary to form an oxide film having high quality with a clean ozone gas with a high concentration of about from 200,000 ppm (428 g/Nm$^3$) to 350,000 ppm (750 g/Nm$^3$) and an ozone gas suppressed in byproducts, such as NOx.

The constitution of the ozone concentrating system will be described. In FIGS. 7 and 8, an oxygen gas is fed to an ozone generating system 200 from a raw material gas cylinder 4 for generating an ozone gas mainly containing at least oxygen. In the ozone generating system 200, for example, ozonized oxygen of about 163,000 ppm (350 g/Nm$^3$) is generated. The ozone concentrating system 100 is constituted by two ozone concentrating chambers 11, a metallic cooling plate 15 disposed at an upper part of the ozone concentrating chamber 11 to surround it, a freezing machine 14 capable of cooling by feeding a cooling medium from a freezing apparatus provided outside, and a heat retention material 16 disposed further surrounding them for maintaining a temperature where condensed ozone is vaporized.

In the ozone concentrating chamber 11, the gas space is divided into upper and lower with an oxygen transmission membrane (130) in a thin membrane form. The ozonized gas generated by the ozone generator 200 is fed to the lower side of the divided two gas spaces, and the gas pressure of the lower space is set to 0.2 MPa (P2) with an automatic pressure controller APC (1B). The other gases space is controlled to have a pressure lower than the gas pressure of the lower space with an automatic pressure controller APC (3B). In this embodiment, it is set to 0.02 MPa (P1), which is near the atmospheric pressure. The oxygen transmission membrane (130) in a thin membrane form in the ozone concentrating chamber 11 is a sheet constituted by extremely fine pores, and it is contrived that the sheet is folded in several tens times to constitute one module to increase the contact area with the ozonized gas. The oxygen transmission membrane (130) is so constituted to have a vertical space constitution that in the case where the ozone gas is adsorbed to each other or ozone is adsorbed to the wall, whereby the ozonized gas becomes ozone clusters (vapor) having a large weight, it falls down to the lower side by gravitation, and an oxygen gas and an ozone gas in a monomolecular form having a small weight raised up to the upper side. The ozonized gas fed to the ozone concentrating chamber 11 is concentrated in the chamber to a concentrated ozonized gas, which can be retrieved from the lower part through the automatic pressure controller APC (1B) and fed to the ozone processing system 300. The diluted gas thus diluted can be retrieved from the upper part through the automatic pressure controller APC (3B), and the gas is processed with the waste ozone apparatus 5 and discharged to the atmosphere or reused.

The interior of the ozone concentrating chamber 11 is divided into two spaces with the oxygen transmission membrane (130) disposed in the chamber. In one space of the two divided spaces, an ozonized gas at a prescribed pressure P2 is placed, and the other space is evacuated to a pressure P1 around the atmospheric pressure. According to the procedure, a density gradient of the gas is provided to the oxygen transmission membrane (130) dividing the chamber. Furthermore, since the oxygen transmission membrane (130) is entirely cooled, ozone gas molecules in the ozonized gas are accelerated in adsorption to the oxygen transmission membrane (130) and among the ozone gas molecules as compared to an oxygen gas, whereby ozone is condensed (selective condensation) on the surface of the membrane, and the ozone gas itself becomes an ozone vapor containing molecules attached to each other (ozone clusters). In the case where the gas is in the state, condensed ozone on the membrane and the ozone clusters fall downward by gravitation, and the thermal velocity of the ozone molecules is entirely decreased. On the surface of the oxygen transmission membrane (130) with the ozonized gas in the state, an oxygen gas is more liable to be transmitted through the membrane, and an oxygen gas is selectively transmitted to discharge a gas rich in oxygen (diluted ozonized oxygen gas) from the upper part. An ozone gas that is not transmitted through the oxygen transmission membrane (130) remains in the lower space of the ozone concentrating chamber 11, and as a result, a gas rich in ozone (concentrated ozonized oxygen gas) can be retrieved from the lower part.

The detailed constitutions and means of the freezing machine 14 for cooling the surrounding of the ozone concentrating chamber 11 and the heat retention material 16 are schematically shown in the figure, and peripheral facilities are omitted from the figure. While the heat retention material 16 is shown in the figure symbolically as a thermal insulating material, the heat retention material 16 is constituted by adding a vacuum thermal insulation system. Numeral 17d denotes an emergency valve for discarding the entire ozonized oxygen gas in the ozone concentrating chamber without concentrating, and the gas flows in the piping path to the waste ozone apparatus (which is not shown in the figure) by bypassing the piping path of the automatic pressure controller 3B. Numeral 71 denotes a thermocouple for measuring the temperature of the metallic cooling plate 15. Numeral 73 denotes a pressure gage for monitoring the pressure in the ozone concentrating chamber 11. Numeral 74A denotes an ozone concentration detector for the ozone concentrated gas, and 74B denotes an ozone concentration detector for the ozonized gas fed from the ozone generator 21.

Numeral 9 denotes a total controlling system of the ozone concentrating system setting the ozone raw material gas flow rate Q1, the ozone generator pressure P0, the diluted ozonized gas flow rate Q2, the diluted gas discharge pressure P1 and the inner pressure P2 of the ozone concentrating chamber, monitoring the temperature of the cooling plate 15, the ozone concentration of the fed ozonized oxygen gas, the concentrated ozone concentration, and the inner pressure of the ozone concentrating chamber, controlling switching of the valves for inputting and outputting of the ozone concentrating chamber 11, displaying the concentrations and the flow rates of the respective parts, and sending signals to the outside. Numerals 7A denotes a vacuum evacuating device for making negative pressure for the ozone processing system 300 and the ozone concentrating system 100, and 35 and 36 denote pressure gages for matching the gas pressures of the concentrated gas retrieving port 22 and the diluted gas retrieving port 20 of the ozone concentrating system 100.

The function and operation of the ozone concentrating system of the embodiment 2 of the invention will be described. Under the state where the valve 17a provided in the vicinity of the gas feeding port 10 at the center part of the ozone concentrating chamber 11 is closed, the ozone concentrating chamber 11, the ozone processing chamber 3 and the gas piping system are evacuated to vacuum with the vacuum evacuating device 7A to remove the gas remaining inside and to remove impurities. For the operation, the valves 17b, 17c and 17d of the ozone concentrating system 100, the valve of the ozone processing system 300, and the flow rate controlling valves 31, 32, 33 and 34 are fully opened.

The automatic pressure controller (APC) 1B is also opened. The freezing machine provided on the outer periphery of the ozone concentrating chamber 11 is operated to freeze the chamber to the prescribed temperature ranges. The metallic cooling plate 15 provided on the outer periphery of the ozone concentrating chamber 11 has a structure having good thermal conductivity and exerting freezing capability sufficiently for cooling. In order to maintain the upper part of the ozone concentrating chamber 11 to a temperature where adsorption of ozone and transmission of oxygen gas can be accelerated (for example, from −65° C.), the thermal insulating material 16 has a large thickness. In order to maintain the lower part of the ozone concentrating chamber 11 to a temperature (for example, 0° C.) higher than the cooling temperature of the upper part, the thermal insulating material 16 has a small thickness.

After sufficiently evacuated to vacuum, and confirming that the ozone concentrating chamber 11 is cooled to the prescribed cooling temperature ranges, with the pressure gage 73 and the thermocouple 71, the flow rate controlling valves 32 and 33 of the ozone processing system 300 are closed to maintain vacuum the interior of the ozone processing chamber 3. In the state where the flow rate controlling valve 17d on the diluted gas retrieving port 20 of the ozone concentrating system 100 is fully closed, the valve 17a, which is the ozonized gas feeding port 10, of the ozone concentrating system 100 is opened to feed 10 L/min of an oxygen gas to the ozone concentrating chamber 11 of the ozone concentrating system from the oxygen cylinder 4 through the ozone generating system 200, and to discharge to the waste ozone processing apparatus 5 and the processed gas decomposing chamber 8.

In the ozone generating system 200, the oxygen gas flow rate is controlled to an oxygen gas flow rate of 10 L/min with the mass flow rate controller 2A, and the gas pressure in the ozone generator 21 is controlled to a constant value of 0.25 MPa with the automatic pressure controller 2B. In the ozone concentrating system 100, the gas pressure at the diluted gas retrieving port is set to P1 around the atmospheric pressure with the automatic gas pressure controller 3B, and the gas pressure in the ozone concentrating chamber 11 is set to 0.2 MPa with the automatic pressure controller 1B at the concentrated gas retrieving port, whereby an oxygen gas flows at the concentrated gas retrieving port 20 and is discharged to the processed gas decomposing chamber 8 through the bypass piping path of the ozone processing system 300.

After setting to the state where an oxygen gas can be continuously fed, an alternating electric current is applied to the ozone generator 21 of the ozone generating system 200 to effect silent electric discharge, whereby an ozonized oxygen gas having a flow rate of about 9.185 L/min and an ozone concentration of 350 g/Nm$^3$ is generated with the ozone generator 21 and fed to the ozone concentrating chamber 11. According to the operation, the ozonized oxygen gas is separated to the concentrated ozonized gas, which is continuously fed, when the pressure of the ozone concentrating chamber 11 is controlled to 0.2 MPa, and the discharge pressure of the upper dilution side is controlled to 0.02 MPa. A part of an oxygen gas of the ozonized gas of 350 g/Nm$^3$ fed from the ozone generator 21 is transmitted through the oxygen transmission membrane (130) and discharged to the dilution side (i.e., the upper part of the concentrating chamber 11).

FIG. 8 is a schematic diagram showing the ozone concentration mechanism of the embodiment 2 of the invention. As shown in the figure, an oxygen gas is consistently transmitted through the oxygen transmission membrane (130) by the pressure difference (P2−P1) provided on the surface thereof. Since the oxygen transmission membrane (130) is entirely cooled, ozone gas molecules in the ozonized gas are accelerated in adsorption to the oxygen transmission membrane (130) and among the ozone gas molecules as compared to an oxygen gas, whereby ozone is condensed (selective condensation) on the surface of the membrane, and the ozone gas itself becomes an ozone vapor containing molecules attached to each other (ozone clusters). In the case where the gas is in the state, condensed ozone on the membrane and the ozone clusters fall downward by gravitation, and the thermal velocity of the ozone molecules is entirely decreased. An ozone gas that is not transmitted through the oxygen transmission membrane (130) remains in the lower space of the ozone concentrating chamber 11, and as a result, a gas rich in ozone (concentrated ozonized oxygen gas) can be retrieved from the lower part.

Condensation of a gas depends on a temperature of the gas and a temperature of a substance, to which the gas is adsorbed, and in physical sense, when the gas temperature becomes equal to or lower than the saturated vapor pressure temperature, a gas exceeding the saturated vapor amount is condensed. Condensation of a gas also depends on the adsorbed amount of the substance (i.e., the oxygen transmission member 130), to which the gas is adsorbed, and in the case where it is tried to increase the surface area of the oxygen transmission member 130, such an effect is obtained that the specific gas can be selectively condensed at a higher temperature than the saturated vapor pressure temperature of the gas. For example, an ozone gas is condensed at from about −112 to about −134° C. of the saturated vapor pressure characteristics, but in the case where the surface area of the oxygen transmission member 130 is increased, it can be condensed at a high temperature range of from 0 to −100° C. Accordingly, in the case where the oxygen transmission membrane (130) of the embodiment 2 of the invention is enlarged, it can be condensed at a high temperature range (0 to −100° C.) to facilitate selective transmission of oxygen through the oxygen transmission membrane (130), and to make higher the cooling temperature of the freezing machine, whereby an ozone gas can be condensed with a general purpose freezing machine, the freezing machine can be reduced in size, the thermal insulating material and the like of the chambers can be thinned, and thus the entire apparatus can be inexpensive.

In FIG. 7, the concentrated ozonized oxygen gas 18 and the diluted ozonized oxygen gas 19, which are concentrated and diluted at the upper and lower parts of the ozone concentrating chamber 11, thus separated are retrieved from the retrieving ports therefor to the outside through the ozone concentration meter 74A, the automatic pressure controller 1B and the automatic pressure controller 3B. After confirming that the concentrated ozonized oxygen gas 18 has been stably concentrated to a prescribed ozone concentration with the ozone concentration meter 74A, the controlling valves 32 and 34 of the bypass piping path of the ozone processing system 300 are fully closed, and the controlling valves 31 and 33 for feeding to the ozone processing chamber 3 are opened, whereby the concentrated ozone gas is diffused in the entire ozone processing chamber 3 through adiabatic expansion.

The pressure in the ozone processing chamber 3 is managed and adjusted with the pressure gage 35 and the valve 33, and the ozone process is effected after making the temperature of the material to be processed (such as a wafer) in the ozone processing chamber 3 to a processing temperature, whereby an oxide thin film with high quality can be obtained on the surface of the material to be processed (such as a wafer).

Devices of the ozone concentrating system, apparatuses, valve operations and detailed signal lines of sensors are not apparently shown herein, but the aforementioned operations can be totally controlled and monitored with the controlling system 9.

FIG. 9 is a block diagram showing the gas pressure balance and the gas distribution mechanism of the aforementioned ozone concentrating system of the embodiment 2 of the invention.

In the figure, numeral 2A denotes a mass flow rate controller MFC1 controlling the flow rate of the raw material gas fed to the ozone generator 21, 2B denotes an automatic back pressure controller APC1 controlling the pressure in the ozone generator 21 to a constant pressure (for example, 0.25 MPa) to control output of the ozonized oxygen gas, 1A denotes an automatic back pressure controller APC3 capable of controlling the pressure P1 of the diluted gas discharged from the ozone concentrating system 100, and 1B denotes an automatic back pressure controller APC2 controlling the gas pressure in the ozone concentrating system 100 to a prescribed pressure consistently. Numeral 79 denotes an oxygen compressor for increasing the pressure of the diluted gas discharged from the ozone concentrating system 100.

For example, the prescribed pressure P2 is set to 0.2 MPa with APC2 (1B), whereby the open/close degree of a needle valve in APC2 (1B) is automatically controlled to control the ozonized gas pressure on the concentrating space in the ozone concentrating chamber to 0.2 MPa (P2) consistently. In the state with the constant pressure, APC3 (3B) on the diluted gas retrieving side is set to 0.05 MPa, which is around the atmospheric pressure, whereby the open/close degree of a needle valve in APC3 (3B) is automatically controlled to control the pressure on the dilution space in the upper part of the ozone concentrating chamber to a constant value of 0.05 MPa (P1). In the case where a pressure difference of 0.15 MPa (=P2−P1) is provided with the APCs to the spaces in the ozone concentrating chamber with the oxygen transmission membrane (130) intervening between them, an oxygen gas in the ozonized oxygen gas on the concentrating space side flows to the diluting space side by being selectively transmitted through the oxygen transmission membrane (130), whereby the diluted ozonized gas (oxygen gas) can be retrieved through APC3 (3B) with the pressure balance of 0.05 MPa (P1) maintained. The oxygen gas can be efficiently utilized in such a manner that the gas obtained by compressing the diluted ozonized thus retrieved with the oxygen compressor 79 is added to the piping on the side of the cylinder for feeding the raw material gas of the ozone generator. The ozone concentration of the ozonized gas on the concentrating space side is increased by selectively transmitting an oxygen gas through the oxygen transmission membrane (130), whereby the concentrated ozonized gas can be continuously retrieved through APC2 (1B). In order to increase the concentrating degree of the ozonized gas on the concentrating space side of the ozone concentrating chamber, it is necessary to increase the transmission amount of an oxygen gas through the oxygen transmission membrane (130), and it is effective therefor that the pressure difference (P2−P1) between the diluting space and the concentrating space is increased, the surface area of the oxygen transmission membrane (130) is increased, and the ozonized gas is cooled by cooling the ozone concentrating chamber, whereby the selective transmission amount of the oxygen gas through the oxygen transmission membrane (130) is increased.

By setting the pressure of the ozonized gas fed from the ozone generator to from 0.1 to 0.5 MPa, the pressure P2 on the concentrating side of the ozone concentrating chamber can be from 0.1 to 0.5 MPa, and the pressure difference (P2−P1) between the diluting space and the concentrating space can be sufficiently ensured with the pressure P1 on the diluting side higher than the atmospheric pressure, whereby such a function can be obtained that an oxygen gas can be selectively transmitted by the oxygen transmission membrane (130). In the case where the pressure of the ozonized gas fed from the oxygen generator is 0.5 MPa or more, however, the ozone concentration generated in the ozone generator is considerably low, and it is not effective since the concentrated ozone concentration that can be retrieved becomes low.

In the case where one of the pressures P1 and P2 of APC2 (1B) and APC3 (3B) is controlled, the pressure difference (P2−P1) between the diluting space and the concentrating space varies to provide such an effect that the ozone concentration of the concentrated ozonized gas thus retrieved can be controlled.

In the apparatus, such an effect is obtained that the ozone concentration and flow rate of the concentrated ozonized gas that can be retrieved can be controlled depending on the flow rate and concentration of the ozonized gas fed from the ozone generator.

Upon cooling an ozonized gas, an ozone gas increases the adsorbed amounts to the adsorption substance and among molecules of the ozone gas, as compared to an oxygen gas, as shown in FIG. 10 (i.e., selective adsorption effect of ozone gas upon cooling). The amount of an oxygen gas that is transmitted through the oxygen transmission membrane (130) is larger than an ozone gas since an ozone gas is $2/3$ in mass and small in size of one molecule as compared to an ozone molecule. Furthermore, upon cooling the ozonized gas, ozone is facilitated in adsorption to a substance or among molecules of the ozone gas, whereby the transmission amount of an oxygen gas is increased with respect to the ozone gas, and thus the amount of the oxygen gas is selectively increased by cooling. FIG. 11 is a characteristic diagram showing the transmission magnification of the oxygen gas with respect to the ozone gas of the oxygen transmission membrane (130) calculated in consideration of the adsorption effect of ozone and difference in mass between oxygen and ozone. As seen from FIGS. 10 and 11, in the case where the interior of the concentrating chamber is cooled particularly to from 0 to −100° C., an oxygen gas can be efficiently transmitted. In the case where it is cooled to −100° C. or lower, there arises such a problem that commercially available refrigerating machines therefor are lessened and become expensive, and the thermal insulator of the ozone concentrating chamber is necessarily thickened.

In the apparatus for concentrating an ozonized oxygen gas of the embodiment, the oxygen transmission membrane (130) is shown, but it may be a sintered material capable of transmitting an oxygen gas, and the material therefor is preferably a ceramic material or Teflon (a trade name) having ozone resistance.

In the case where a large amount (several hundreds ppm or more) of nitrogen is contained in the gas fed to the ozone gas generator, the generator forms a NOx gas and nitric acid ($HNO_3$) in addition to an ozone gas, and the NOx gas and nitric acid ($HNO_3$) accelerates deterioration of the oxygen transmission membrane (130). Accordingly, the service life of the ozone concentrating chamber is shortened.

In the ozone concentrating method by a conventional liquid apparatus or adsorption apparatus, the entire amount of an ozone gas to be retrieved is once liquefied or adsorbed in an adsorbing or liquefying step shown by the encircled number 1 in FIG. 6, then the interior of the apparatus is evacuated to vacuum in the vacuum step shown by the encircled number 2, then the apparatus in vacuum is heated for gasifying to form an around 100% ozone gas as in the encircled number 3, and ozone is diluted with a carrier gas as in the encircled number 4, whereby a prescribed concentrated ozonized gas is retrieved. Accordingly, it is necessary to process unnecessary ozone with a waste ozone apparatus in the steps 1 to 3, and thus the ozone concentrating efficiency is as considerably poor as about 40% at most. It is necessary in the step 2 to form high concentration ozone of nearly 100%, and thus such a problem arises that a large protection device is necessary, and the temperature and pressure are necessarily managed sufficiently, for consistently preventing explosion from occurring in the step of forming the high concentration ozone through desorption from the liquefied or adsorbed ozone.

In the ozone concentrating method by the embodiment 2 of the invention, on the other hand, based on the ozone concentration generated from the ozone generator 21, an ozone gas is selectively condensed in the ozone concentrating chamber 11, and the chamber is divided by the oxygen transmission membrane (130) with a pressure difference, whereby an oxygen gas is selectively transmitted through the oxygen transmission membrane (130), and the transmitted gas is continuously discharged, so as to increase the concentration. Accordingly, ozone can be concentrated with significantly high efficiency.

Furthermore, in the apparatus, since the highly concentrating step is effected based on the ozone concentration generated by the ozone generator 21, there is such an advantage that the risk of explosion can be significantly reduced.

An ozonized gas containing an ozone gas is used as the gas containing plural gas species fed to the apparatus for concentrating and diluting, the pressure P1 of the diluted gas retrieving part is equal to or higher than the atmospheric pressure (0 MPa), and the pressure P2 of the concentrated gas retrieving part is set to a range of from 0.1 to 0.5 MPa, whereby the pressure difference (P2−P1) between the diluting space and the concentrating space can be sufficiently ensured (0.1 MPa or more) to obtain an effect of selectively transmitting an oxygen gas through the oxygen transmission membrane (130), and no vacuum equipment is necessary since the pressure P1 of the retrieving part is equal to or higher than the atmospheric pressure (0 MPa).

An ozonized gas containing an ozone gas is used as the gas containing plural gas species fed to the apparatus for concentrating and diluting, and the ozone gas diluted gas (oxygen gas) retrieved from the diluted gas retrieving part of the chamber is increased in pressure with the gas compressor, so as to reuse the gas as a raw material gas of the ozone gas generator, whereby an oxygen gas can be efficiently used.

An ozonized gas containing an ozone gas is used as the gas containing plural gas species fed to the ozone concentrating system, and a nitrogen-free ozone generator generating an ozone gas from a high purity oxygen gas having an addition amount of a nitrogen gas of 1 ppm or less is used as the ozone generator generating an ozonized gas, whereby the concentrated ozonized gas having a stable concentration can be retrieved from the ozone concentrating chamber for a prolonged period of time, and thus such an effect is obtained that the reliability of formation of an oxide film with ozone in a semiconductor production apparatus can be improved.

In the case where the apparatuses for concentrating and diluting a specific gas, such as the ozone concentration apparatuses of the embodiment 2, are provided plurally as a multistage cascade, the degree of concentrating can be improved.

Embodiment 3

Figure 12:
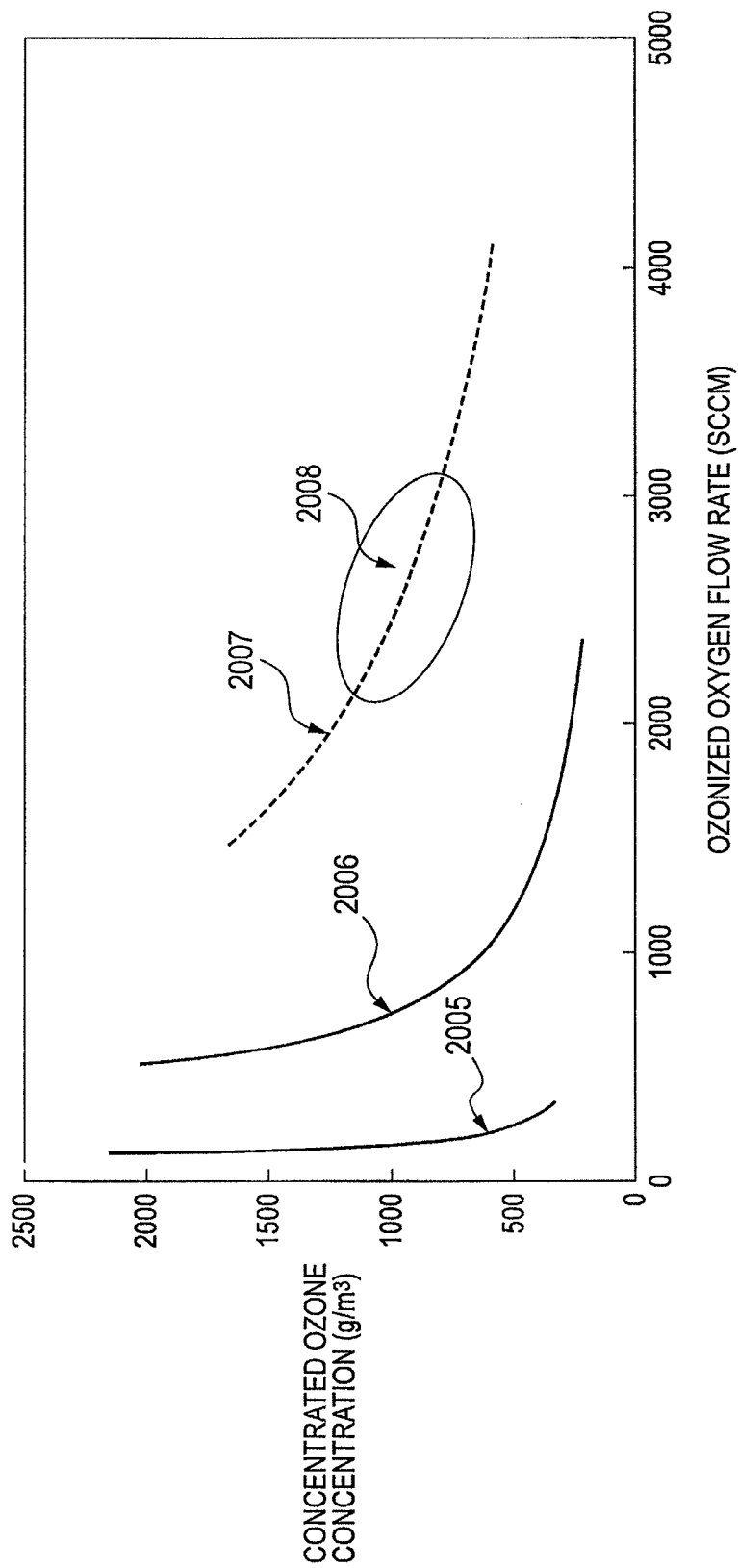
FIG. 12 is a diagram showing relationship between concentrated ozone concentration characteristics with respect to a flow rate of a concentrated ozonized oxygen gas that can be output and using regions of concentrated ozone in the embodiments 1 and 2 of the invention.

An embodiment 3 shows a use example of the ozone concentrating system of the embodiments 1 and 2. FIG. 12 is a diagram showing comparison of concentrated ozone concentration characteristics with respect to the flow rate of the ozonized oxygen in the conventional concentrated ozone apparatus, and concentrated ozone concentration characteristics of an example of the invention, and FIGS. 13-*a* and 13-*b* are diagrams showing examples of single wafer type and batch type apparatuses, in which concentrated ozone of the invention is applied to formation of an oxide film in a semiconductor production apparatus. FIG. 14 shows vapor pressure characteristics of gas species contained in an ozone gas.

FIG. 12 shows the concentrated ozone concentration characteristics with respect to the flow rate (SCCM) of ozonized oxygen, in which the characteristic curve 2005 shows the ozone concentration characteristics by a conventional liquid ozone apparatus, and the characteristic curve 2006 shows the ozone concentration characteristics by a conventional adsorption ozone apparatus. The characteristic curve 2007 shows an example of ozone concentration characteristics of the invention, and the region 2008 shows the target region of high concentration ozone that is to be demanded in future for a batch type ozone CVD apparatus in the semiconductor manufacturing industry.

By using the ozone concentrating system described in the embodiments 1 and 2 of the invention, an ozonized oxygen gas having a high concentration can be obtained without using a too large apparatus, and the ozone generated amount of the ozone generator can also be suppressed owing to the high efficiency in concentrating, whereby such an advantage is obtained that the system can be reduced in size.

In a semiconductor production apparatus utilizing ozone, an ozonized oxygen gas is utilized in a CVD process for forming an interlayer dielectric film and the like in the production process of an integrated circuit (IC) device.

In particular, an ozonized oxygen gas having been concentrated to have a high concentration can be suppressed in loss in oxidation reaction, such as return to an oxygen gas due to collision with other gases (oxygen gas) than an ozone gas, and active oxygen having been efficiently converted from ozone undergoes oxidation reaction with a substance to be oxidized, whereby an oxide film having good quality capable of suppressing leakage electric current can be formed at a high rate. According to the advantage, it is being studied to employ a high concentration ozonized oxygen gas in a mass production line in future. Furthermore, since oxidation reaction is accelerated with high concentration ozone, thermal energy for dissociating ozone to active oxygen can be decreased, whereby it receives attention as a gas necessary for the purpose of low temperature oxide film formation. Under the existing circumstances, a concentrated ozonized oxygen gas can be concentrated to nearly 100% highly concentrated ozone, but the flow rate and supplying pressure of supplied ozone are low, and there are problems in continuous supplying and in supplying the concentrated ozonized oxygen gas at a stable concentration. Accordingly, there has been made such a constitution for avoiding the problems that an ozone concentrating apparatus and a semiconductor processing apparatus (such as a CVD apparatus) are connected with a piping that is as short as possible to integrate the apparatuses.

In the ozone concentrating apparatuses of the embodiments 1 and 2 of the invention, the supplied ozone flow rate, which is the aforementioned problem, is 3,000 SCCM (3 L/min) for obtaining high concentration ozonized oxygen as shown in FIG. 12. The supplying pressure of an ozone gas is managed to set a low pressure in a conventional apparatus due to the explosion limit shown in FIG. 6, but in the ozone concentrating apparatus of the invention, since an ozone gas is increased in concentration based on the concentration obtained from the ozone generator 21, there is reduced risk of rapid increase in pressure as compared to a conventional apparatus, and thus the supplying pressure can be increased as compared to a conventional apparatus.

Figure 13A:
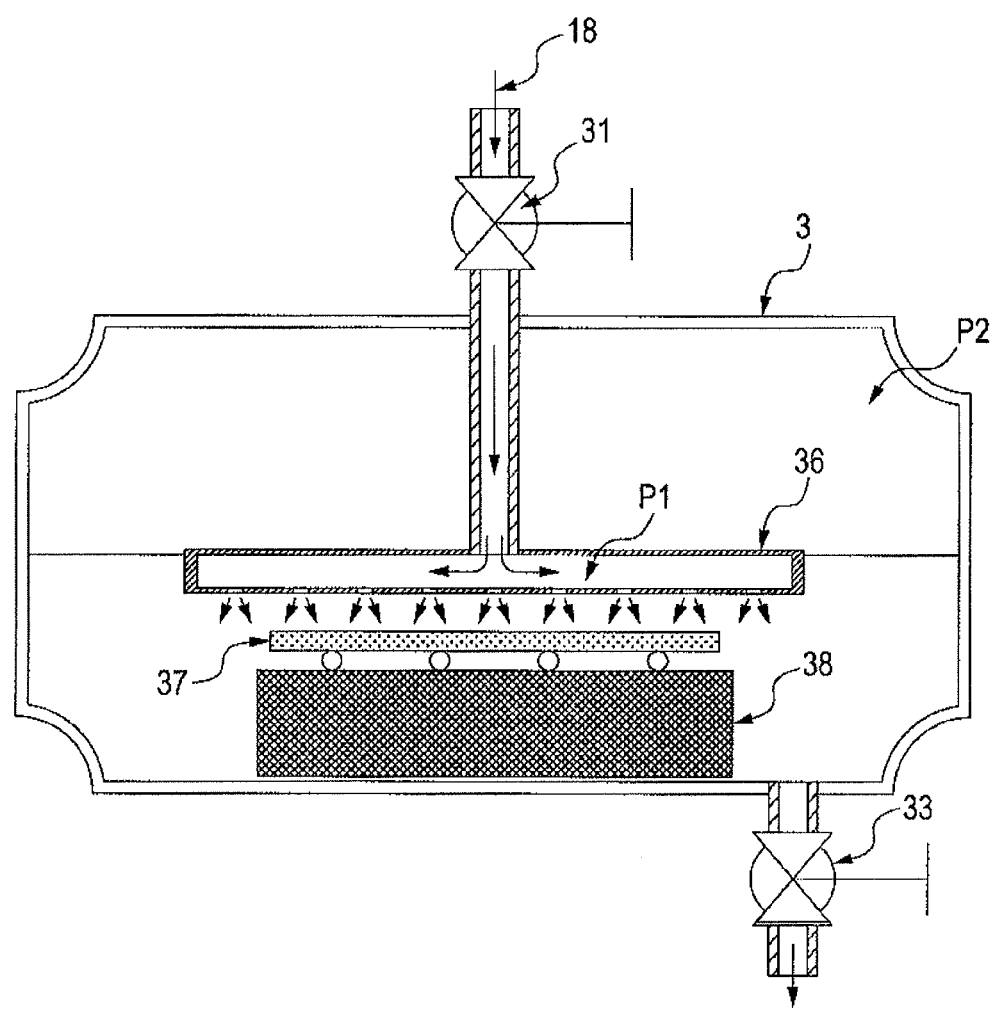
FIG. 13-*a* is a constitutional diagram of a single wafer type CVD apparatus utilizing concentrated ozonized oxygen of the ozone gas concentrating system apparatus of the embodiments 1 and 2 of the invention.
Figure 13B:
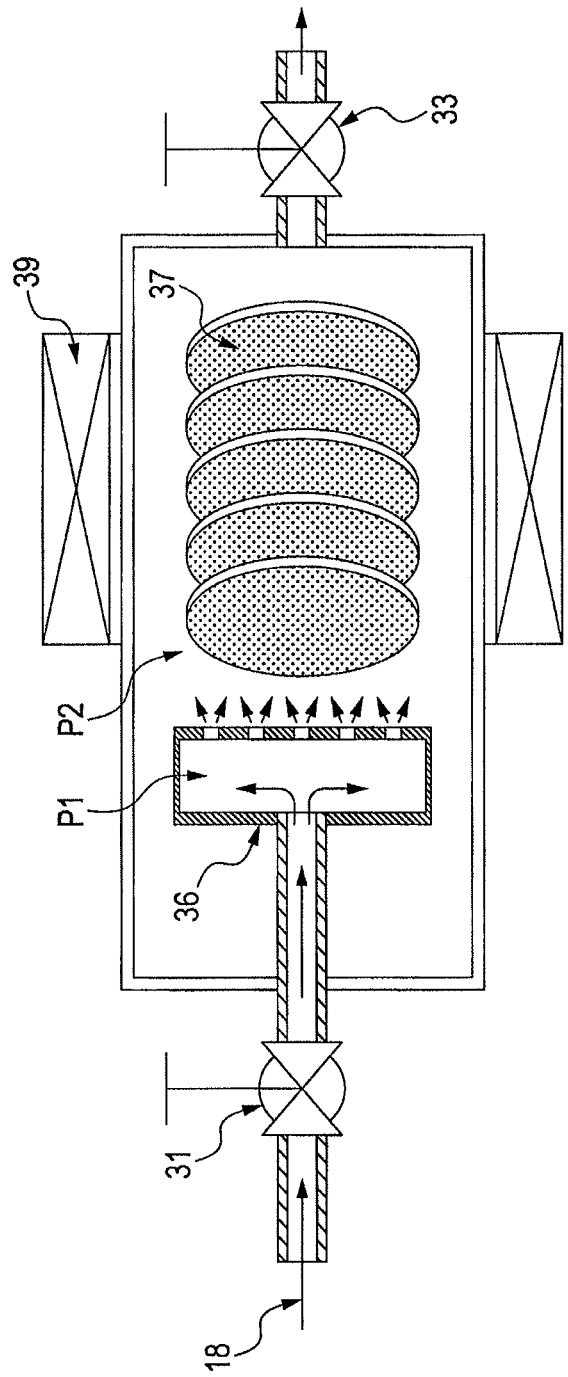
Figure 14:
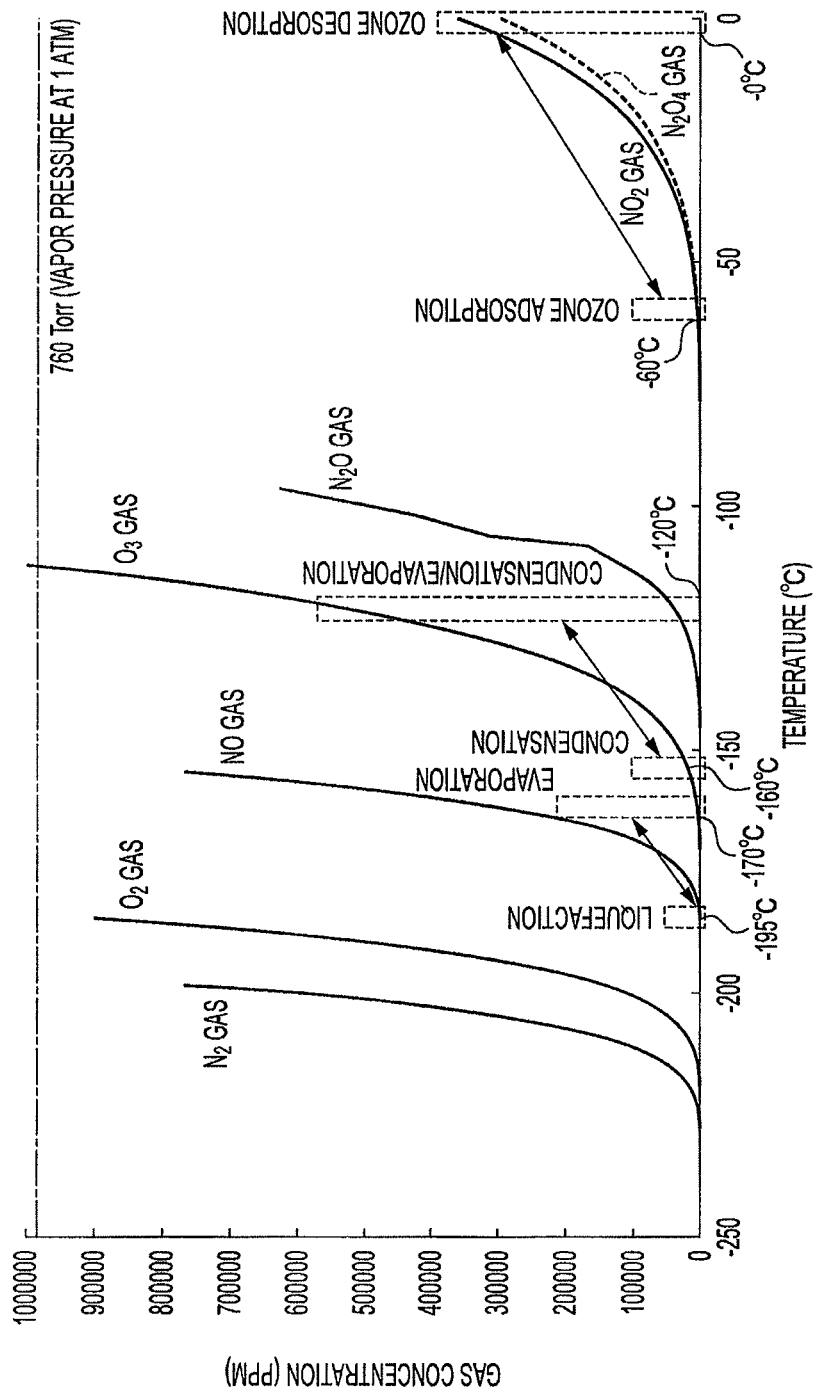
FIG. 14 is a diagram showing relationship between vapor pressures of gas species contained in an ozonized oxygen gas, and temperature regions of a conventional concentrated ozonized oxygen gas apparatus and temperature regions of a concentrated ozonized oxygen gas apparatus of the embodiments 1 and 2 of the invention.

In the case where a single wafer type CVD apparatus shown in FIG. 13-*a* and a batch type CVD apparatus shown in FIG. 13-*b* are provided by utilizing the advantages of the concentrated ozone apparatuses of the embodiments 1 and 2 of the invention, a concentrated ozone gas can be uniformly filled in the entire CVD chamber 3, and an interlayer dielectric film can be formed with a high yield. In FIGS. 13-*a* and 13-*b*, numeral 31 denotes an ozone supplying valve, 33 denotes a processed gas discharge valve, and 36 denotes a nozzle pipe for diffusing an ozonized oxygen gas 18. The nozzle pipe 36 has plural nozzle holes 36*a* having a diameter of 1 mm or less opened therein. Numeral 37 denotes a wafer as a material to be processed, and 38 in FIG. 13-*a* denotes a pedestal having equipped therewith a heater (which is not shown in the figure). Numeral 39 in FIG. 13-*b* denotes a heater for heating a wafer from the outside of the chamber 3.

In the apparatuses, in the state where the processed gas discharge valve 33 is opened to evacuate the interior of the CVD chamber 3 to vacuum, when the processed gas discharge valve 33 is closed, and the ozone supplying valve 31 is fully opened, an ozone gas of a supplying pressure P1 is once accumulated in the nozzle pipe 36, and the ozonized oxygen gas 18 is diffused by adiabatic expansion into the chamber 3 through the nozzle part 36 with the difference in pressure from the vacuum chamber pressure P1, so as to be filled in the entire chamber 3.

The ozone gas output from the nozzle part 36 undergoes adiabatic expansion to provide such an effect that the gas is cooled to a low temperature to prevent the ozone gas from being decomposed.

Upon concentrating ozone, a concentrated ozonized gas contains an impurity gas other than an oxygen gas depending on the operation temperature for concentrating.

In general, as described in Patent Document 7, an ozone generator 21 uses a gas containing several percent of less of a nitrogen gas in an oxygen gas, as a raw material gas, and it is becoming apparent that NOx clusters, such as $NO_2$, generated through discharge chemical reaction of the nitrogen gas accelerate dissociation of oxygen atoms to form ozone.

Table 1 describes an ozone generation mechanism with a raw material gas, oxygen and nitrogen, and in an ordinary ozone generator, a raw material gas containing a slight amount of nitrogen added to an oxygen gas is subjected to light, electron dissociation and chemical catalytic reaction by high electric field silent electric discharge to form an ozone gas. In the mechanism of generating an ozone gas through light, electron dissociation and chemical catalytic reaction, ozone is generated by the following reaction formulae.

A nitrogen gas having a low ionization potential generates electrons having high energy of about from 7 to 10 eV through silent electric discharge with a short gap of 0.1 mm. A nitrogen gas is excited to a negative ion $N_2^- B^2$ through collision of the high energy electrons and the $N_2$ molecules in the ground state of the nitrogen gas, and the excited ions $N_2^- B^2$ undergo deexcitation to the first negative band. Upon deexcitation, ultraviolet light (discharge light hV) having a radiation spectrum of from 360 to 430 nm is radiated.

In the case where nitrogen $N_2$ and high energy electrons collide with each other, or nitrogen $N_2$ is irradiated with the discharge light hV, nitrogen is dissociated to nitrogen atoms, and a slight amount of an $NO_2$ gas is generated through chemical reaction of the dissociated nitrogen atoms and an oxygen gas (step 1).

In the case where a slight amount of the thus generated $NO_2$ gas is irradiated with discharge light hV having a specific wavelength (from 360 to 430 nm), an NO gas and O atoms are generated through photochemical reaction. An $NO_2$ gas and O atoms are generated through chemical reaction of the NO gas and an $O_2$ gas (step 2). In the step 2, a slight amount of an $NO_2$ gas functions as a catalyst to generate a large amount of O atoms.

Upon generating a large amount of O atoms in the discharge field, since the pressure of the discharge field where ozone is generated is in a state of high pressure plasma of about 0.25 MPa, collision of molecules and atoms are almost triple collision. Energy is exchanged through the triple collision chemical reaction of O atoms, $O_2$ molecules, the wall (M) and the like, and $O_3$ (ozone) is generated in an amount corresponding to O atoms thus generated (step 3). Accordingly, since O atoms are generated in a large amount through the catalytic function of $NO_2$, ozone can be efficiently generated in a high concentration.

Byproducts are also generated in addition to generation of ozone, and chemical reaction shown in step 4, i.e., chemical reaction of an $NO_2$ gas and $O_3$ (ozone) generates an $N_2O_5$ gas, chemical reaction of nitrogen ions and O ions generates $N_2O$, and a slight amount of water contained in the cylinder and NO ions generate a slight amount of nitric acid clusters, whereby these byproducts are generated in the ozonized oxygen gas thus retrieved.

TABLE 1

Ozone generation mechanism with raw material with raw material gas, oxygen and nitrogen Generation condition of ozone $O_2$ + Several percent of $N_2$ + Slight amount of $H_2O$ + High electric field silent electric discharge
Nitrogen ultraviolet light hv of high electric field silent electric discharge:
360 to 430 nm (First negative band radiation spectrum)

$$N_2 + e \Longrightarrow N_2 - B^2 \longrightarrow N_2 - B^2 \Longrightarrow N_2 - X^2 + h\nu$$

(Step 1) Dissociation of nitrogen and generation of $NO_2$

Generation of $NO_2$ $$N_2 + e \Longrightarrow 2N^+ \qquad 2N^+ + O_2 \Longrightarrow NO_2$$
$$N_2 + h\nu \Longrightarrow 2N^+$$

(Step 2) Generation of oxygen atoms with $NO_2$ and discharge light hv (catalytic chemical reaction)

$$NO_2 + h\nu \Longrightarrow NO + O$$

Catalytic function of $NO_2$! Generation of O atoms $$O_2 \longrightarrow NO_2 + O_2 \Longrightarrow NO_2 + O$$

(Step 3) Generation of ozone with oxygen atoms (triple collision)

Generation of ozone $$O_2 \longrightarrow O_2 + O + M \Longrightarrow O_3$$

(Step 4) Generated gas other than ozone gas (impurity gas)

Generation of $N_2O_5$ $$NO_2 + O_3 \Longrightarrow O_2 + NO_3 \longrightarrow NO_2 + NO_3 \Longrightarrow N_2O_5$$

Generation of $N_2O$ $$N_2 + e \Longrightarrow 2N^+ \longrightarrow 2N^+ + O^{2-} \Longrightarrow N_2O$$

Generation of nitric acid clusters with water in gas (cyclinder)

$$H_2O \Longrightarrow 2H^+ + O^{2-} + e \longrightarrow 2H^+ + O_2 + NO^- \Longrightarrow HNO_3$$

That is, a large amount of O atoms is generated through catalytic function of NOx clusters, such as $NO_2$, so as to generate ozone. Accordingly, upon considering that an ozone concentration (about several percent by volume to 20% by volume), which is about 10,000 times the $NO_2$ amount, is generated through the catalytic function of several tens ppm of $NO_2$ and the photochemical reaction of the discharge light, the phenomenon is physically appropriate, and it can be explained that ozone can be sufficiently generated. It has been considered that high energy electrons generated through short gap silent electric discharge with a gap of 0.1 mm and an oxygen gas collide with each other to generate O atoms. However, although high energy electrons capable of dissociating O atoms can be generated through silent electric discharge, the density of the high energy electrons capable of dissociating O atoms during discharge is about from $10^9$ to $10^{10}$ per unit volume (per $m^3$), and such a mechanism has been believed without explanation that ozone of from several percent by volume to 20% by volume ($0.3 \times 10^{19}$ per $cm^3$) is generated with such an extremely small electron density. In recent years, an ozone generator is developed by selecting a photocatalytic substance capable of substituting the catalytic function of the NOx clusters, such as $NO_2$, assuming the aforementioned principle, and a nitrogen-free ozone generator is commercially available.

However, an ozone gas generated from an ordinary ozone generator contains NOx since nitrogen is contained in a raw material gas. The NOx gas output from the ozone generator is almost $N_2O_5$, $N_2O$ and nitric acid clusters $HNO_3$. $N_2O_5$ is liquefied at 0° C. or less to be $N_2O_5$ clusters present in the ozone gas. $N_2O$ has a melting point around –90° C.

Research on vapor pressure characteristics of the gas species contained in the ozone generator reveals FIG. 14. Accordingly, since liquefaction occurs at 80 k (–193° C.) in an ozone concentrating apparatus, in which ozone is concentrated by liquefaction, not only ozone but also an $N_2O$ gas, nitric acid clusters $HNO_3$ and $N_2O_5$ clusters are liquefied and vaporized at 100 K (–173° C.), whereby a concentrated ozone gas containing substantially no NOx can be obtained. In this method, however, upon liquefying, an $N_2O$ gas, nitric acid clusters $HNO_3$ and $N_2O_5$ clusters in a liquefied state remain in the apparatus, and an $N_2O$ gas, nitric acid clusters $HNO_3$ and $N_2O_5$ clusters are necessarily removed (removal of NOx) periodically.

In an adsorption type ozone concentrating apparatus concentrating ozone by adsorption, since adsorption occurs at about –60° C., in an ozonized oxygen gas generated from the ozone generator, not only ozone but also an $N_2O$ gas, nitric acid clusters $HNO_3$ and $N_2O_5$ clusters are adsorbed. In order to desorb ozone having been adsorbed at 0° C., an $N_2O$ gas having a higher temperature of vapor pressure characteristics than an ozone gas is output as a mixture with an ozone gas in a concentrated ozone gas. Nitric acid clusters $HNO_3$ and $N_2O_5$ clusters are partially vaporized and output in a concentrated ozone gas as nitric acid clusters $HNO_3$ and $N_2O_5$ clusters, but almost entire acid clusters $HNO_3$ and $N_2O_5$ clusters remains as being adsorbed on the adsorbent. Accordingly, $HNO_3$ and $N_2O_5$ are accumulated in the adsorbent to cause deterioration in performance of the adsorbent.

In an ozone concentrating apparatus, in which ozone is selectively condensed, and condensed ozone is vaporized in the same space, or an oxygen transmission membrane (130) selectively transmitting an oxygen gas other than an ozone gas is used, so as to remove an oxygen gas in an ozonized gas, for example, ozone is selectively condensed by utilizing adsorption at a low temperature of –60° C., and condensed ozone is vaporized at –0° C., whereby an $N_2O$ gas, nitric acid clusters $HNO_3$ and $N_2O_5$ clusters generated in the ozone generator are contained in the concentrated ozone gas, but an $N_2O$ gas, nitric acid clusters $HNO_3$ and $N_2O_5$ clusters are not accumulated in the ozone concentrating apparatus. Accordingly, it is not necessary to remove NOx periodically, which is the case in a liquid type ozone concentrating apparatus, and there is no problem in deterioration in performance of an adsorbent, which is the case in an adsorption type ozone concentrating apparatus, whereby an apparatus having higher practicality can be provided.

In an ozone CVD apparatus for forming an interlayer dielectric film as a semiconductor production apparatus, when an $N_2O$ gas, nitric acid clusters $HNO_3$ and $N_2O_5$ clusters are contained in an ozonized oxygen gas, they causes deposition of a metallic contamination substance, such as metallic chromium and manganese, at a part where the ozonized oxygen gas is in contact with the part of the apparatus in the gas, and the metallic contamination invades in the oxide film to deteriorate insulating property of the oxide film, which brings about increase in leakage electric current. Thus, there is a problem of failing to form an oxide film with good quality. Such an ozone gas is demanded that is decreased as much as possible in amount of NOx, which causes deposition of a metallic contamination substance. Accordingly, in the ozone concentrating apparatus of the invention, a nitrogen-free ozone generator using a photocatalytic substance capable of generating ozone by feeding a high purity oxygen gas of 99.999% or more containing no nitrogen is used as the ozone generator, whereby a concentrated ozonized oxygen gas that is considerably decreased in amount of NOx can be provided.

Figure 15:
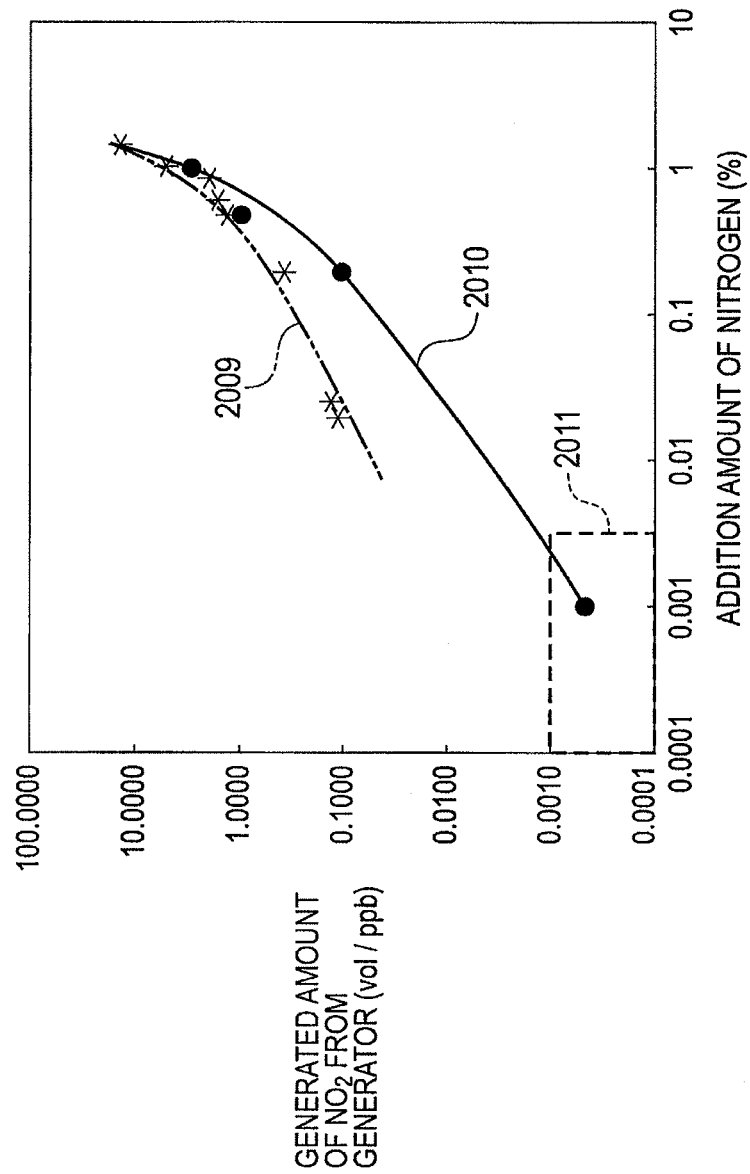
FIG. 15 is a diagram showing a nitrogen addition rate in an ozone generator and a NOx amount contained in ozonized oxygen retrieved from the ozone generator.

FIG. 15 is a diagram showing a nitrogen addition rate of a raw material gas in an ozone generator and an $NO_2$ amount (converted value) generated by the ozone generator. As a means for measuring NOx contained in an ozonized oxygen gas having ozone generated, the generated ozonized oxygen gas is bubbled in pure water to dissolve NOx in pure water as nitric acid ($HNO_3$), and the ion amount of $NO_3^-$ dissolved in pure water is measured to measure NOx generated in the ozone generator. The $NO_2$ gas amount generated in the ozone generator can be calculated from the $NO_3^-$ ion amount.

In FIG. 15, the characteristic curve 2009 is calculated from Table 3 of Patent Document 8. The characteristic curve 2010 shows the characteristics obtained by measuring in the apparatus of the invention. The figure shows that $NO_2$ is generated in an amount of 100,000 vol/ppb at a nitrogen addition rate of about 1%, and when the nitrogen addition rate is decreased, the $NO_2$ amount is decreased. In a nitrogen-free ozone generator generating ozone only with a high purity oxygen gas of 99.999% or more, the nitrogen content is 0.005% or less, and the $NO_2$ amount generated in this case is 0.001 vol/ppb (region 2011) or less, i.e., ozonized oxygen to be fed has a considerably small NOx amount, so as to provide a high concentration ozonized oxygen gas containing substantially no NOx in an ozone gas concentrated.

Embodiment 4

Figure 3A:
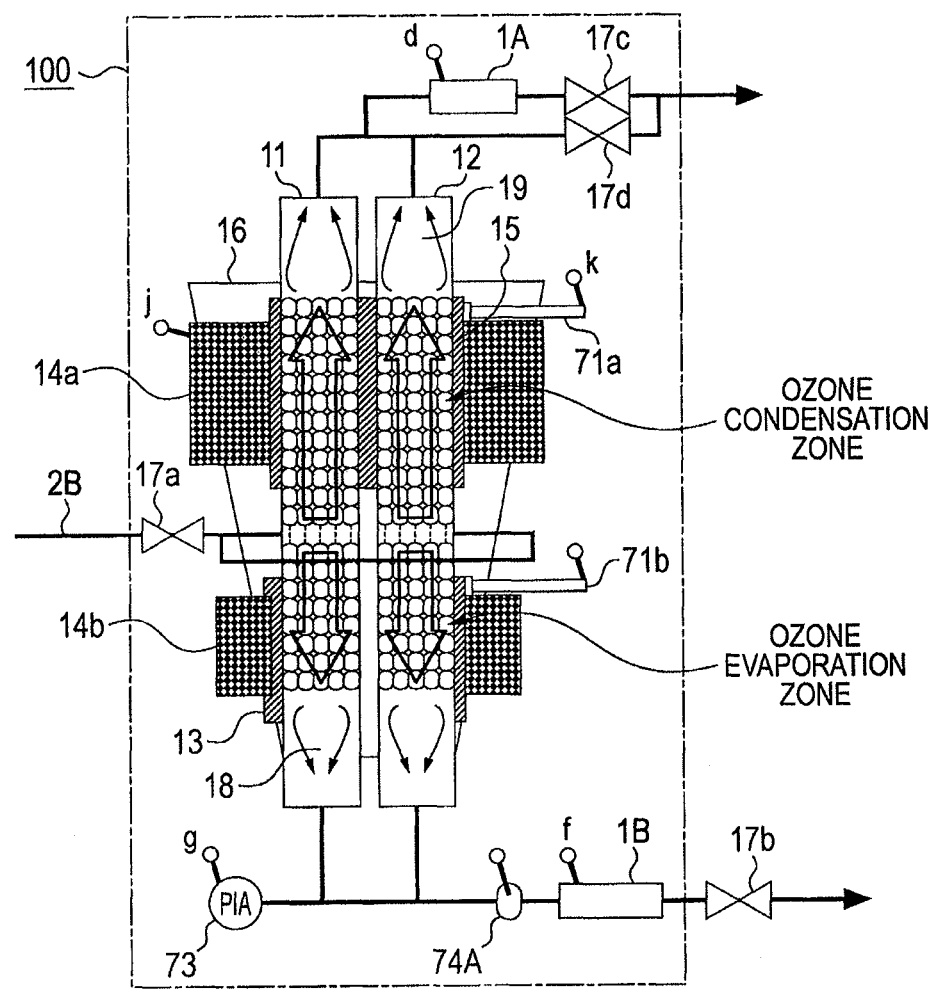
FIG. 3-*a* shows an ozone concentrating chamber main body of an ozone gas concentrating system in an embodiment 2 (selective condensation of an ozone gas) of the invention.
Figure 3B:
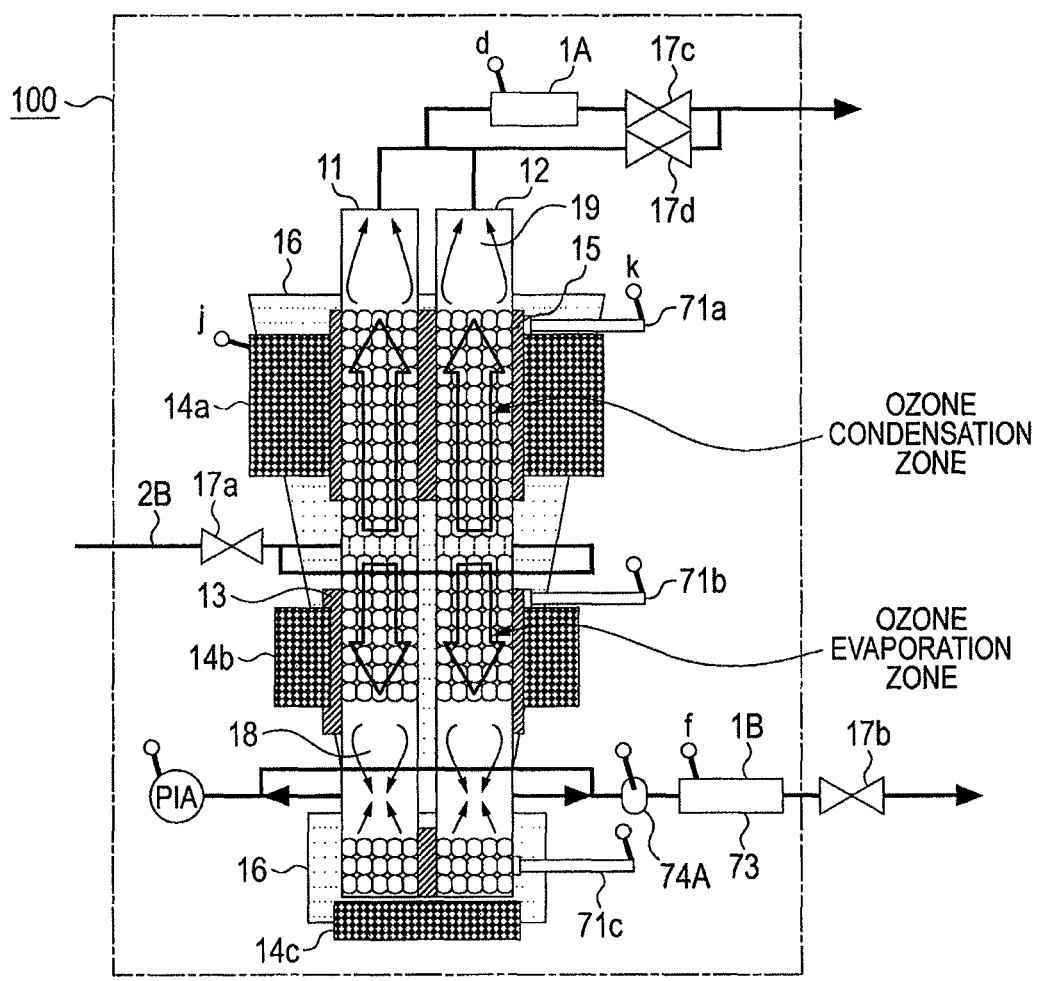

FIGS. 3-*a* and 3-*b* show an ozone concentrating system 100 of an embodiment 4 of the invention. As compared to the embodiment 1 described with reference to FIG. 1, this embodiment shows an example where the constitution of the freezing machine 14, the arrangement of the particle material 13 for condensation and vaporization in the concentrating chambers 11 and 12, and the like are changed. In FIG. 3-*a*, the freezing machine is divided into two, 14*a* and 14*b*, the freezing machine 14*a* is disposed at the upper part of the concentrating chambers 11 and 12, and the freezing machine 14*b* is disposed at the lower part thereof. In the upper part, the cooling temperature is the optimum temperature for selectively condensing an ozone gas, thereby making an ozone condensation zone. In the lower part, the cooling temperature is a temperature range where ozone is gradually vaporized, thereby making an ozone vaporization zone.

In FIG. 3-b, the freezing machine is divided into three, 14a, 14b and 14c, the freezing machine 14a is disposed at the upper part of the concentrating chambers 11 and 12, the freezing machine 14b is disposed at the lower part thereof, and the freezing machine 14c is disposed at the bottom part of the concentrating chambers 11 and 12. In the upper part, the cooling temperature is the optimum temperature for selectively condensing an ozone gas, thereby making an ozone condensation zone. In the lower part, the cooling temperature is a temperature range where condensed ozone is gradually vaporized, thereby making an ozone vaporization zone. In the bottom part of the concentrating chambers 11 and 12, the cooling temperature is set about a temperature (from $-60$ to $0°$ C.) equal to or high than $-112°$ C. The particle material for condensation and vaporization is filled also in the bottom part of the concentrating chambers 11 and 12. According to the constitution, condensed ozone is vaporized in the vaporization zone, and liquid ozone that has not been sufficiently vaporized in the zone falls downward to the bottom part and is certainly vaporized in this zone.

In order to prevent liquid ozone accumulated on the bottom part from being rapidly vaporized, such a constitution is provided that the particle material for condensation and vaporization is also filled in the bottom part to increase the surface area of the particle material for condensation and vaporization at a low temperature, whereby rapid gasification is prevented.

In the invention, while a system for concentrating an ozone gas with one stage of condensation-vaporization zone is shown, it is possible that further several stages of concentrating chambers are provided for the diluted ozone gas, whereby nearly 100% of the ozone gas generated from the ozone generator is condensed to obtain high concentration ozonized oxygen.

Embodiment 5

While a concentrating system of an ozonized oxygen gas has been described in the aforementioned embodiments 1 to 4, the invention may be utilized as such a measure, as another example, that air containing a NOx gas, Freon gas or a carbon dioxide gas is cleaned (diluted) or concentrated to improve efficiency of decomposition process of a NOx gas, Freon gas or a carbon dioxide gas. A NOx gas contained in air mainly includes $NO_2$, $N_2O_5$, $N_2O$, NO and $HNO_3$. $N_2O_5$ and $HNO_3$ have a high melting point and are present in a cluster state (vapor state) but not in a gas state around $0°$ C. The melting points of $NO_2$, $N_2O$ and NO are about $-60°$ C., $-140°$ C. and $-180°$ C., respectively, as shown in the vapor pressure characteristics in FIG. 14.

Figure 16:
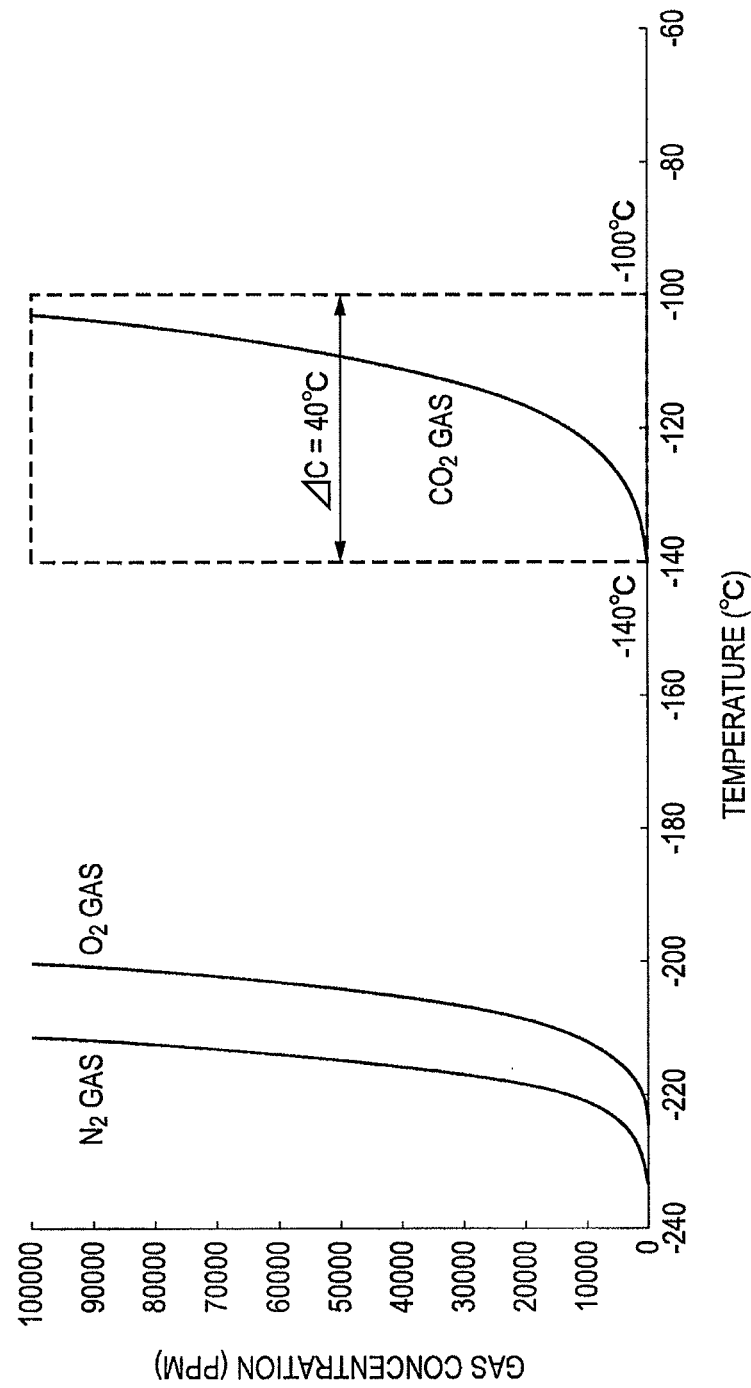
FIG. 16 is a diagram showing vapor pressure characteristics of oxygen, nitrogen, Freon and a carbon dioxide gas.

A Freon gas discharged to the atmosphere has a melting point of about from $-70$ to $-30°$ C. A carbon dioxide gas ($CO_2$) has a melting point of about $-140°$ C. as shown in vapor pressure characteristics in FIG. 16. Accordingly, in order to dilute (clean) or concentrate these gases, it is necessary to change the cooling temperature of the concentrating chamber depending on the target gas for diluting or concentrating. The gas having been concentrated is a corrosive gas, and it is necessary to select materials having sufficient corrosion resistance for parts, such as pipings and valves, for the concentrated gas.

Figure 17:
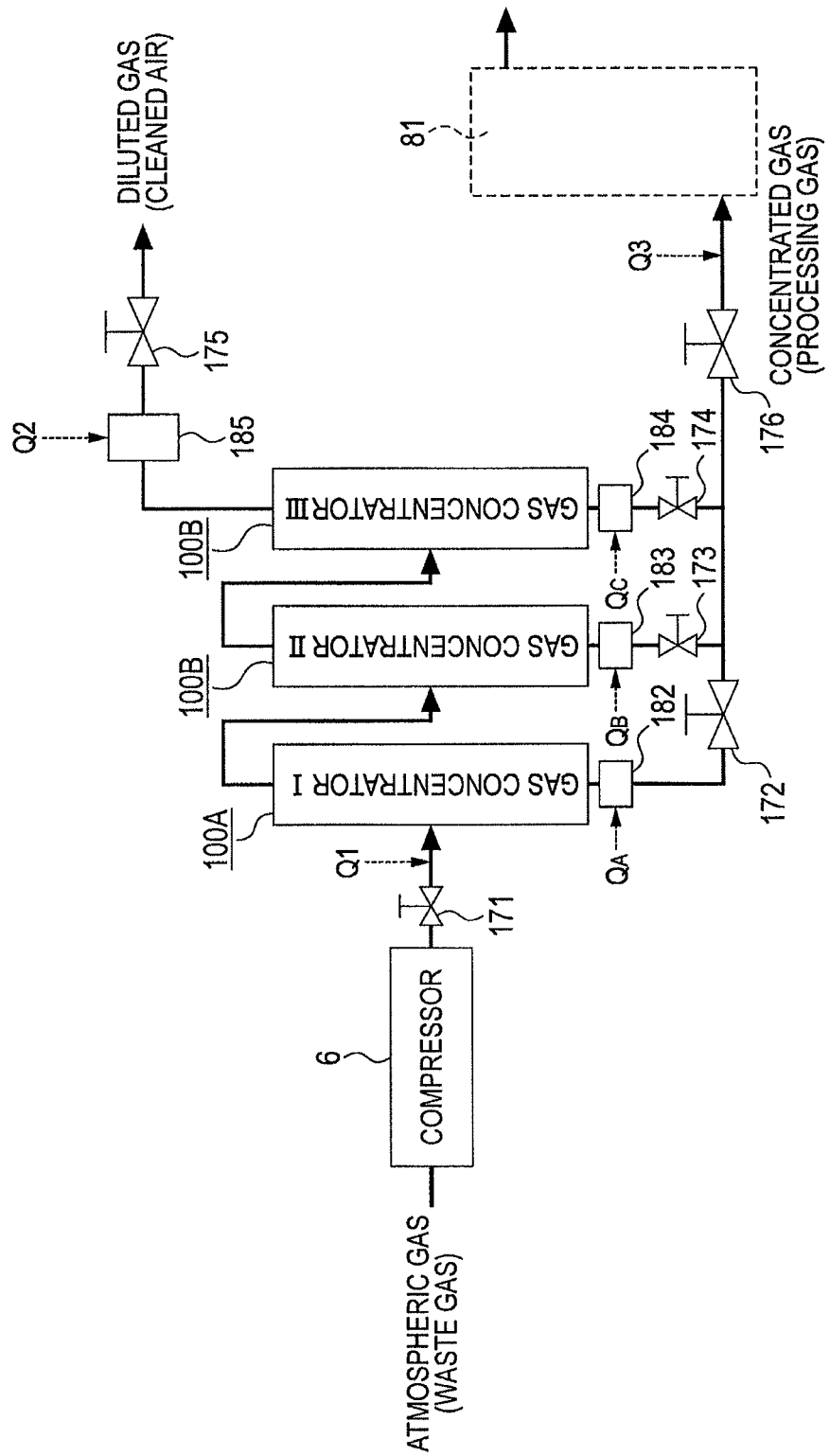
FIG. 17 is an illustration of a carbon dioxide gas concentration and decomposition system apparatus showing constitution of concentration and dilution of a carbon dioxide gas contained in air and a waste gas in an embodiment 3 of the invention.

FIG. 17 is an illustration showing a constitution of an apparatus for cleaning or concentrating air containing a NOx gas, a Freon gas and a carbon dioxide gas according to the embodiment 5.

In the figure, numeral 6 denotes a compressor for compressing an atmospheric gas, 171 denotes a controlling valve for feeding the compressed atmospheric gas under controlling in flow rate, 172, 173, 174 and 176 are valves for controlling pressures in gas concentrations systems 100A, 100B and 100C to retrieve a flow rate of a gas contained in the atmospheric gas, and 175 denotes a control valve for retrieving the diluted (cleaned) gas. Numerals 182, 183, 184 and 185 denote gas flow rate meters.

The gas concentrating apparatuses 100A, 100B and 100C have the same constitution as the ozone concentrating system 100 shown in FIG. 1, in which upper parts of the chambers in the gas concentrating apparatuses 100A, 100B and 100C are condensing zones, and lower parts thereof are vaporizing zones for gasifying a liquid condensed at the upper parts, with both zones being cooled. The atmospheric air containing a NOx gas, a Freon gas and a carbon dioxide gas generally contains from 1 to several hundreds ppm of a NOx gas, a Freon gas and a carbon dioxide gas, and in order to concentrate the atmospheric air efficiently, it is compressed to about from 0.3 to 1 MPa with the compressor 6, and then continuously fed (Q1) to the gas concentrating apparatus with the controlling valve 171.

After obtaining the state, the flow rate of the diluted gas retrieved from the upper part is controlled with the valve 175, and a concentrated gas is retrieved at a flow rate Q3 by controlling the pressures of the gas concentrating apparatuses I, II and III by controlling the valves 172, 173, 174 and 176. The retrieved concentrated gas of a flow rate Q3 is decomposed with a gas decomposing apparatus 81. The flow rates Q2 and Q3 of dilution (cleaning) with respect to the fed flow amount Q1 are controlled to have the following flow rate balance by controlling the valves 175, 172, 173, 174 and 176 with monitoring the flow rates displayed in the flow rate meter 185, 182, 183 and 184.

EXAMPLE $Q1$:40 L/min $Q2$:30 L/min $Q_A$:6 L/min, $Q_B$:3 L/min, $QC$:1 L/min $Q1=Q2+Q3=Q2+(Q_A+Q_B+Q_C)$ As having been described, in the apparatus for cleaning and concentrating air containing a NOx gas, a Freon gas and a carbon dioxide gas, it is necessary that concentrating and diluting of a considerably large flow rate are demanded, and the apparatus is inexpensive, while the quality, such as controllability and stability, may be low, and such measures as explosion prevention are not necessary, as compared to the ozone concentrating system apparatus. In order to realize the apparatus, since a mass flow rate controller (MFC) and an automatic pressure controller (APC), which are used in the ozone concentrating system, cannot be used, all the flow rates in the respective parts are manually controlled with the controlling valves and flow rate meters as shown in FIG. 17.

In order to increase the cleanliness degree of the diluted (cleaned) gas, a multistage constitution with the second and third step gas concentrating apparatuses for further diluting the diluted gas from the first step.

In the ozone concentrating apparatus of the invention, a mass flow rate controller (MFC) is provided on the side for retrieving diluted ozone, and an automatic pressure controller (APC) is provided on the side for retrieving concentrated ozone, so as to maintain the pressure in the zone concentrating chamber constant and to control the flow rate of diluted ozone, whereby the concentrated ozone flow rate is distributed, but the same advantage as in the invention can be obtained by providing a mass flow rate controller (MFC) on the side for retrieving concentrated ozone, and APC on the side for retrieving diluted ozone.

The flow rate on the side for retrieving diluted ozone is controlled with MFC, but the same advantage as in the invention can be obtained by controlling the flow rate with a valve instead of MFC.

APC is used on the side for retrieving concentrated ozone for automatically control the flow rate for retrieving to maintain the pressure in the ozone concentrating chamber constant, but the same advantage as in the invention can be obtained by making the pressure in the ozone concentrating chamber constant with a combination of MFC and a pressure gage, or a flow rate controlling valve and a pressure gage, instead of APC.

The performance of the efficiency in concentrating ozone and the performance, such as compactness, inexpensiveness and light weight, of the apparatus in the invention can be further improved by optimizing the design in the invention including the constitution of the freezing machine, the size and amount of the material for condensation and vaporization in the ozone concentrating chamber, the diameter, material and length of the ozone concentrating chamber, the length where the material for condensation and vaporization is filled, which are determined by the thermal boundary layer, viscosity, specific heat and thermal conductivity in the stream of the ozonized oxygen gas, and the thermal conductivity, specific heat and the like of the ozone concentrating chamber, in addition to the constitution and functions of the ozone concentrating chamber of the invention.

INDUSTRIAL APPLICABILITY

The invention contributes to improvement in production efficiency by applying to, in addition to the semiconductor production technique, such industrial fields as the field of supplying an ozone gas, the field of removing $CO_2$ in the atmospheric air, and the field of removing NOx and Freon contained in a waste gas.

The invention claimed is:

1. A method for concentrating or diluting only a specific gas from a gas containing plural gas species wherein a chamber is filled therein a particle material for condensation and vaporization of the specific gas or is equipped therein a gas transmission member selectively transmitting other gases than the specific gas, with a function of cooling the gas in the chamber, and a gas feeding and retrieving system having a function of retrieving a gas containing the specific gas having been diluted or retrieving a gas containing the specific gas having been concentrated is provided; and including the following steps: introducing the specific gas containing the plural gas species to the chamber; cooling the gas in the chamber, thereby selectively condensing only the specific gas or selectively transmitting the other gases than the specific gas on a surface of the particle material or the gas transmission member, so as to realize dilution of the specific gas by a diluted gas retrieving part of the chamber; and heating a surrounding of a concentrated gas retrieving part of the chamber while streaming down a liquid condensed on the surface of the particle material or the gas transmission member to a lower part of the chamber by gravitation, thereby vaporizing the condensed gas on the surface of the particle material to realize high concentration of the specific gas at a concentrated gas retrieving part of the chamber, and continuously retrieving a gas containing the specific gas having been diluted from the diluted gas retrieving part of the chamber or a gas containing the specific gas having been concentrated from the concentrated gas retrieving part of the chamber.

2. The method for concentrating or diluting a specific gas according to claim 1, wherein at least one of an automatic pressure controller (APC) for controlling an inner pressure of the chamber and a mass flow rate controller (MFC) for controlling a flow rate of a gas retrieved from the chamber, on at least one of the gas retrieving port of the diluted gas retrieving part and the gas retrieving port of the concentrated gas retrieving part of the chamber, further including:
  automatically controlling an inner pressure of the chamber to a prescribed pressure with the automatic pressure controller (APC), and
  setting a flow rate of a gas containing the specific gas having been retrieved from the diluted gas retrieving part of the chamber through them with the mass flow rate controller (MFC), thereby enabling automatic control of a concentrated gas concentration and flow rate upon continuously retrieving a gas containing the specific gas having been concentrated.

3. The method for concentrating or diluting a specific gas according to claim 1, wherein a chamber is equipped therein the gas transmission member, further including: providing an automatic pressure controller I (APC I) controlling an inner pressure P1 of the chamber of a diluted gas having removed the specific gas by transmitting other gases than the specific gas at the diluted gas retrieving part of the chamber, providing an automatic pressure controller II (APC II) controlling an inner pressure P2 at the concentrated gas retrieving part of the chamber, thereby producing a gas pressure difference $\Delta P$ ($=P2-P1$) on sides on the gas transmitting members, continuously retrieving a gas containing the specific gas having been diluted from the diluted gas retrieving part of the chamber and a gas containing the specific gas having been concentrated from the concentrated gas retrieving part of the chamber; and varying at least one set pressures of the automatic pressure controller I (APC I) and the automatic pressure controller II (APC II), thereby enabling control of a concentrated gas concentration upon continuously retrieving the gas containing the specific gas having been concentrated.

4. The method for concentrating or diluting a specific gas according to claim 1, wherein the chambers are provided plurally as a multistage cascade to improve the degree of concentrating of the concentrated gas of the specific gas and the degree of diluting of the diluted gas of the specific gas.

5. The method for concentrating or diluting a specific gas according to claim 1, wherein the gas containing plural gas species fed to the chamber is an ozonized gas containing an ozone gas, and the ozone in the ozonized gas is highly concentrated.

6. The method for concentrating or diluting a specific gas according to claim 1, wherein the gas containing plural gas species fed to the chamber for concentrating and diluting is air containing at least one of a carbon dioxide gas, a NOx gas and a Freon gas, and the gas contained in air is concentrated to separate into air containing the gas having been concentrated and air containing the gas having been diluted.

* * * * *